United States Patent
Matsuguchi et al.

(10) Patent No.: US 7,626,139 B2
(45) Date of Patent: Dec. 1, 2009

(54) METHOD FOR MANUFACTURING SEAMED FLUX-CORED WELDING WIRE

(75) Inventors: Akira Matsuguchi, Fujisawa (JP); Kuniaki Miyazaki, Fujisawa (JP); Norio Masaie, Fujisawa (JP)

(73) Assignee: Kabushiki Kaisha Kobe Seiko Sho, Kobe-shi (JP)

(*) Notice: Subject to any disclaimer, the term of this patent is extended or adjusted under 35 U.S.C. 154(b) by 138 days.

(21) Appl. No.: 10/910,586

(22) Filed: Aug. 4, 2004

(65) Prior Publication Data

US 2005/0044687 A1 Mar. 3, 2005

(30) Foreign Application Priority Data

Aug. 28, 2003 (JP) ............................. 2003-304775

(51) Int. Cl.
*B23K 35/02* (2006.01)
(52) U.S. Cl. ............................. 219/145.1; 219/145.22; 219/137 R
(58) Field of Classification Search ............. 219/145.1, 219/145.22, 137 R, 145.32, 136
See application file for complete search history.

(56) References Cited

U.S. PATENT DOCUMENTS

| | | | | |
|---|---|---|---|---|
| 3,226,817 A | * | 1/1966 | Simborg et al. ............... 29/430 |
| 3,303,323 A | * | 2/1967 | Claussen ................. 219/137 R |
| 3,318,729 A | * | 5/1967 | Siegle et al. ................. 428/385 |
| 3,670,135 A | * | 6/1972 | Zvanut .................... 219/137 R |
| 3,848,109 A | * | 11/1974 | Zvanut .................... 219/146.41 |
| 4,214,145 A | * | 7/1980 | Zvanut et al. ........... 219/145.22 |
| 4,950,151 A | * | 8/1990 | Zachariades .............. 425/379.1 |
| 5,201,206 A | * | 4/1993 | Russo ............................. 72/40 |
| 5,672,287 A | * | 9/1997 | Masaie et al. .......... 219/145.22 |
| 5,688,420 A | * | 11/1997 | Gotoh et al. ............ 219/145.23 |
| 5,821,500 A | * | 10/1998 | Araki et al. .................. 219/155 |
| 5,918,495 A | * | 7/1999 | Miyamoto et al. ............. 72/108 |
| 6,337,144 B1 | * | 1/2002 | Shimizu et al. .............. 428/624 |

FOREIGN PATENT DOCUMENTS

| | | | |
|---|---|---|---|
| EP | 0 685 293 A1 | | 12/1995 |
| EP | 0 914 899 A1 | | 5/1999 |
| EP | 914899 A1 | * | 5/1999 |
| JP | 2-52197 | | 2/1990 |
| JP | 2-75497 | | 3/1990 |
| JP | 4-371392 | | 12/1992 |
| JP | 6-15485 | | 1/1994 |
| JP | 7-40080 | | 2/1995 |

(Continued)

*Primary Examiner*—M. Alexandra Elve
(74) *Attorney, Agent, or Firm*—Oblon, Spivak, McClelland, Maier & Neustadt, L.L.P.

(57) ABSTRACT

Disclosed herein is a manufacturing method, excellent in wire drawability, of a seamed flux-cored welding wire having both favorable feedability and low hydrogen content characteristic. The method for manufacturing a seamed flux-cored wire, comprises the steps of: drawing a tube-like formed wire including a flux filled therein using a lubricant; removing the lubricant from the drawn wire by a physical means; and coating a lubricant (coating an oil) for wire feeding on the wire surface. The respective steps are carried out in an in-line manner. In the wire drawing step, a wire drawing lubricant containing a sulfur-bearing high-pressure lubricant is used, and the overall wire drawing from the tube-like formed wire to a roughly product-diameter wire is carried out by means of a roller die.

11 Claims, 6 Drawing Sheets

FOREIGN PATENT DOCUMENTS

| | | |
|---|---|---|
| JP | 10-6083 | 1/1998 |
| JP | 10-128579 | 5/1998 |
| JP | 10-180485 | 7/1998 |
| JP | 11-285892 | 10/1999 |
| JP | 2000-237894 | 9/2000 |
| JP | 2001-179326 | 7/2001 |
| JP | 2001-179481 | 7/2001 |
| KR | 2000-0016065 | 3/2000 |

* cited by examiner

FIG.2
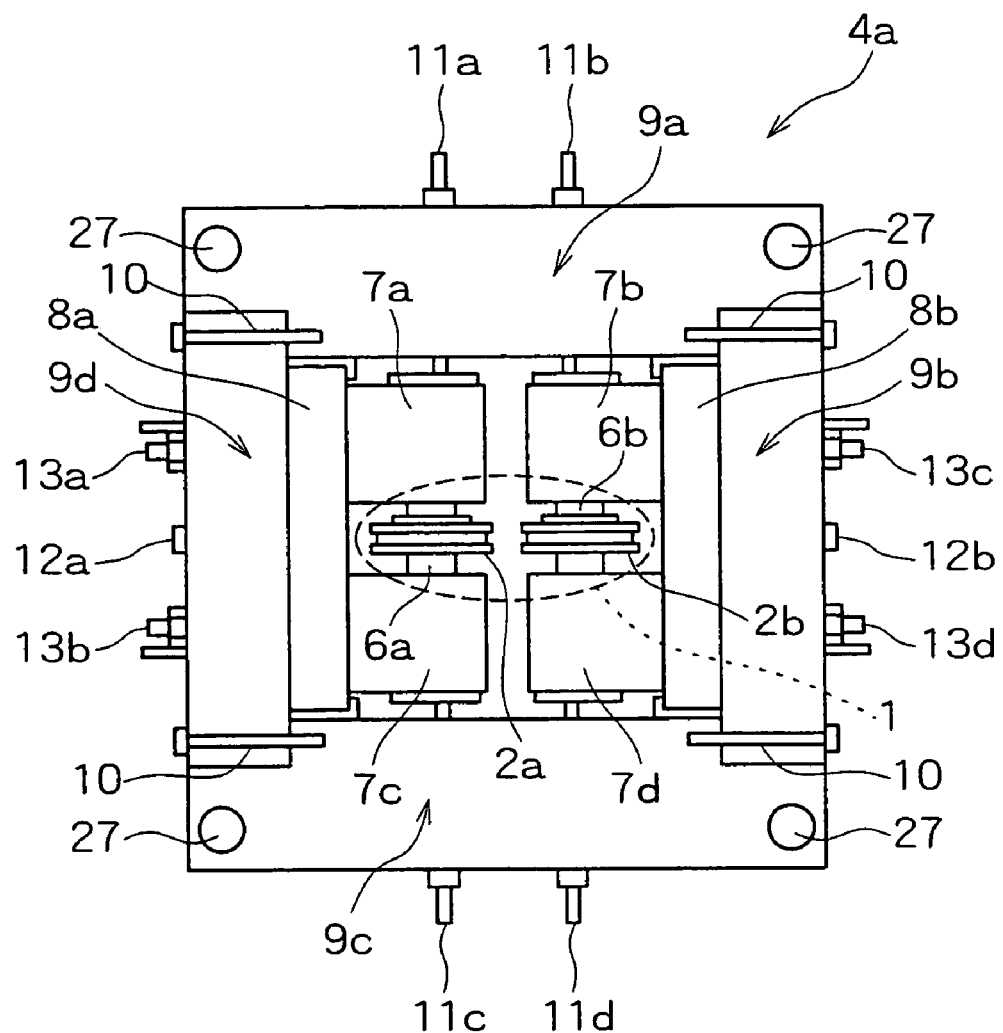
WIRE DRAWING LOAD DIRECTION

METHOD FOR MANUFACTURING SEAMED FLUX-CORED WELDING WIRE

BACKGROUND OF THE INVENTION

1. Field of the Invention

The present invention relates to a method for manufacturing a seamed flux-cored welding wire having both a favorable feedability and a low hydrogen content characteristic, the method being excellent in wire drawability. More particularly, it relates to a method for manufacturing a seamed flux-cored welding wire, suitable as an arc welding wire for fully automatic or semi-automatic welding to be used in welding of a mild steel, a high tensile strength steel, a heat-resistant steel, or the like.

2. Description of the Related Art

Arc welding wires for fully automatic or semi-automatic welding include: a solid wire; and a flux cored wire (which is hereinafter simply referred to as a wire or a FCW) formed by filling a flux in a tube-like sheath steel strip (which is hereinafter also referred to as a hoop or a steel hoop). Out of these, FCWs include a type in which the hoop has a junction (which is hereinafter also referred to as a seam), which is an object of the present invention; and a seamless type in which there is no such a junction. The ones of the latter seamless type require a high manufacturing cost, and hence the FCW having a seam is used in a more versatile manner. However, the wording "the state of having a seam" denotes the state of having a gap (opening) with the joint not having been joined by welding or the like, as shown in FIG. 1B described later.

The seamed FCW is generally used for a welding execution process of $CO_2$ gas shield arc welding, MIG welding, or the like. A drawn wire having a small diameter of 0.8 to 1.6 mm is generally used. The seamed FCW is required to be excellent in feedability of the wire during welding, to be low in hydrogen content of the wire, and to be excellent in porosity-resistance during welding as its important product performances.

First, the feedability of the wire will be described by reference to a wire supply device of FIG. 6. The FCW is subjected to welding in such a state as to be wound around a wire spool 30 or loaded in a pail pack. For the use of the FCW in executing welding, the following pushing method is generally adopted. The FCW is drawn from the spool 30 or the pail pack by feed rollers 32 and 33 of the feeder 31. In addition, the FCW is pushed into a liner included in a conduit cable 34 disposed behind. Then, it is fed to a contact tip 40 in a welding torch 37 attached at the tip of the conduit cable 34 through the liner. The FCW is applied with a voltage between the contact tip 40 and a steel material to be welded 38, thereby to carry out arc welding. The wire supply devices include not only the one of the pushing system, but also various ones of a pull system in which there are feed rollers included inside a welding torch, and a wire is drawn through the inside of the conduit cable, and of a push-pull combined system.

The conduit liner herein used is a flexible guide tube formed by shaping a steel wire in a spiral. It generally has a length of about 3 to 6 m, to a long length of 10 to 20 m, which is selectively used according to the distance to the welding site. In such a series of FCW feeding operation, the FCW is required to be fed with stability at a high or a given speed not depending upon the feeding conditions such as the bending angles of the bent portions 35 and 36, and the like, and the feed distance. The wire feeding systems include various ones as described above. However, in any case, the feedability of the wire is one of the important product quality characteristics of the FCW.

Then, when the hydrogen content of the wire is high, a large quantity of porosities due to hydrogen is generated in the welded site, resulting in welding defects. Therefore, as another important product quality characteristic for the FCW, it is required that the hydrogen content of the FCW is low. For the FCW which is excellent in welding bead shape and welding efficiency as compared with the solid wire, the low hydrogen content characteristic is a particularly important quality characteristic in preventing the welding defect.

Such a seamed FCW is generally manufactured in the following manner. With so-called forming steps such as a step of forming a band steel in a U shape, a step of filling a flux in the U-shaped formed band steel, and a step of forming the U-shaped band steel to a tube-like wire, a tube-like formed wire filled inside with the flux is manufactured. Then, the tube-like formed wire is drawn to a product FCW diameter.

Out of these steps, in wire drawing for manufacturing of a seamed FCW, particularly, the substantial wire drawing step part, providing a large processing ratio (reduction ratio), at the initial stage of wire drawing has been predominantly carried out by means of a hole die, (see, e.g., Japanese Unexamined Patent Publication No. 2001-179326, and Japanese Unexamined Patent Publication Nos. 1998-180485, 1998-6083, and 1990-52197). Further, wire drawing lubrication of the substantial wire drawing step part has been predominantly carried out by a wet lubricant such as an animal or plant oil, a mineral oil, or a synthetic oil (see, e.g., Japanese Unexamined Patent Publication No. 2001-179326, Japanese Unexamined Patent Publication No. 1994-15485, and Japanese Unexamined Patent Publication No. 2001-179481). Incidentally, it is also known that, in a method for manufacturing a FCW for stainless steel welding using a stainless steel as a hoop, a roller die is used in place of the hole die, thereby to carry out wire drawing while carrying out intermediate annealing (see, e.g., Japanese Unexamined Patent Publication No. 1999-285892).

However, with such a wire drawing method using a hole die, the shape accuracy of the drawn wire is high. However, the shear force imposed on a lubricant layer at a die surface is large. As a result, a problem of lubricant film breakage tends to occur. Whereas, when the lubrication of the drawing wire is carried out by means of a non-hydrogen-bearing inorganic dry (solid) lubricant causing no problem of the increase in hydrogen, problems of solidification and clogging in the die hole of the lubricant tend to occur.

For this reason, there is a given limitation on the wire drawing speed with a hole die, so that high-speed wire drawing cannot be performed, resulting in a relatively lower wire drawing efficiency. This leads not simply to a problem of productivity but also to a problem of being unable to reduce the hydrogen content of the wire. Namely, when it is difficult to control the moisture content in the atmosphere in a wire drawing step to a trace amount, low wire drawing efficiency and long wire drawing time may also lead to the following problem. Namely, there is a high possibility that the amount of moisture absorbed by the wire (flux) in wire drawing increases to such a degree as to cause welding defects. This problem becomes noticeable not only for a conventional mild steel, but also particularly for the hoop, which requires a larger working force, and imposes a large load on a die, hence facilitates the occurrences of the vibration of the die and the chatter marks of the wire, and is difficult to draw, of an alloy steel, a stainless steel, or the like.

In contrast, when drawing can be carried out by means of a roller die throughout the process or from first to last of the process including the step part at the initial stage of the drawing providing a large working ratio (reduction ratio), no such a problem as to be caused by the hole die occurs. Accordingly, by the use of the non-hydrogen-bearing inorganic dry lubricant, it is possible to increase the wire drawing speed and to reduce the amount of moisture absorbed. This also enables the enhancement of the productivity of the FCWs.

The roller die is, as described later, a wire drawing device for holding a wire in a die hole formed by a pair of opposing roller die components, and carrying out wire drawing. With this configuration, the shear force imposed on the lubricant layer at the die surface is relatively small as compared with the wire drawing using a hole die. Therefore, the problem of the lubricant film breakage is less likely to occur. Further, also when the lubrication for wire drawing is carried out by means of a non-hydrogen-bearing inorganic dry lubricant not causing a problem of the increase in hydrogen content, problems of solidification and clogging of the lubricant as with a hole die does not occur.

However, conventionally, there has been a perception that wire drawing by means of a roller die provides a wire in the shape of not a perfect circle necessary for a FCW, but of an ellipse, resulting in a defective shape accuracy. As a result, the roller die can be used only partially in a wire drawing process. Namely, as is conventionally known, in the part of the step providing a large working ratio at the initial stage of the drawing, and in the final step of the wire drawing, there is no other choice but to use a plurality of hole dies. Further, for the seamed FCWs, including the FCW of a stainless steel hoop, the wire drawing lubrication in the substantial wire drawing step part is predominantly carried out by a wet lubricant such as an animal or plant oil, a mineral oil, or a synthetic oil. However, so long as the wet lubricant is used, for the seamed FCW, even if the reduction in amount of the lubricant to be used, the composition control, and other ideas are implemented, or even however small the seam distance (gap) is, the wet lubricant consequentially enters into the FCW through the seam, resulting in a higher hydrogen content of the wire. In order to prevent this, proper washing of the wire in an off-line process becomes necessary because the wet lubricant cannot be satisfactorily removed by in-line (on-line) simple washing in the wire drawing process.

Whereas, also in the method for drawing the FCW of the stainless steel hoop by means of a roller die, the stainless steel hoop is relatively harder than the mild steel hoop. For this reason, if lubrication is not carried out satisfactorily, the amount of heat generated in the working process is large even with the roller die. Accordingly, the lubricant undergoes film breakage, resulting in a high possibility that the surface roughening of the wire or breakage during wire drawing occurs. Further, annealing at the stage during wire drawing becomes essential due to the work-hardening of the stainless steel hoop. For this reason, there is still a limitation in increasing the wire drawing speed and the wire drawing efficiency for the overall wire drawing steps.

Therefore, under present circumstances, in actuality, a uniform high-speed wire drawing process by means of a roller die, including the step part providing the large working ratio (reduction ratio) at the initial stage of the wire drawing has not been yet put in a practical use in the manufacturing of the FCW. Still, a uniform high-speed and high wire diameter accuracy wire drawing process by means of a roller die, including a step of forming a band steel in a U shape, a step of filling a flux in the U-shaped formed band steel, and a step of forming the U-shaped band steel to a tube-like wire has not been yet put into a practical use.

SUMMARY OF THE INVENTION

In view of the foregoing circumstances, the present invention has been completed. It is therefore an object of the present invention to provide a method for manufacturing a seamed flux-cored welding wire which has both a favorable feedability and a low hydrogen content characteristic, the method being excellent in wire drawability.

In order to achieve this object, the gist of the method for manufacturing a seamed flux-cored wire of the present invention resides in the following respects. In a method for manufacturing a seamed flux-cored wire comprising a sheath prepared by forming a band steel in a tube and a flux filled inside the sheath, the method comprising the steps of: forming the band steel into U-shape in cross section; the U-shape formed band steel is filled with flux; forming the U-shape formed band steel filled with flux into a tube; drawing a tube-like formed wire using a lubricant; removing the lubricant from the drawn wire by a physical means; and coating a lubricant for wire feeding on the wire surface, the respective steps being to be performed in an in-line manner, in the wire drawing step, a wire drawing lubricant containing a sulfur-bearing high-pressure lubricant is used, and the overall wire drawing from the tube-like formed wire to a product-diameter wire is carried out by means of a roller die.

In the gist of the present invention, the wire drawing process from the tube-like formed wire to a product-diameter wire includes wire drawing to a product-diameter wire, or a wire diameter immediately preceding to the product diameter (close to the product diameter). Incidentally, the wire diameter immediately preceding to the product diameter denotes the diameter of the wire drawn in an area ratio of 1.1 or lower relative to the product wire taken as 1. Whereas, the term "wire drawing" herein referred to includes both the cases: where finishing wire drawing for the purpose of adjusting the circular shape is not included, and where final finishing wire drawing is carried out while adjusting the product diameter by means of only a roller die.

In the present invention, the respective steps of: forming a band steel into a U shape; filling a flux into the U-shaped formed band steel; and forming from the U-shaped band steel to a tube-like wire and the respective steps from :the step of drawing the tube-like formed wire; to the step of coating a lubricant for wire feeding on the wire surface may be all carried out through the same in-line process. Alternatively, these respective steps may also be carried out separately. For example, the following procedure is also acceptable. Namely, the respective steps from the step of forming a band steel into a U shape to the step of forming it into a tube-like wire, or the steps up to the first half steps of drawing of the tube-like formed wire are carried out through the same in-line process. Whereas, the steps from the step of drawing the tube-like formed wire, or the latter half step of the wire drawing to the step of coating a lubricant for wire feeding on the wire surface are carried out through another in-line process. Incidentally, in the present invention, the wording "the respective steps are carried out sequentially through an in-line process" denotes as follows. Namely, while transporting the wire, the foregoing respective steps are continuously and sequentially carried out on the wire being transported.

In the present invention, for manufacturing a seamed flux-cored wire from a band steel (hoop), a wire drawing lubricant containing a sulfur-bearing high-pressure lubricant is used in the foregoing wire drawing process, or preferably the respective steps requiring lubrication from the step of forming the band steel to the wire drawing step. In the present invention, the wire drawing lubricant containing a sulfur-bearing high-pressure lubricant is preferably a non-hydrogen-bearing one. However, even when the wire drawing lubricant containing a sulfur-bearing high-pressure lubricant is a so-called hydrogen-bearing lubricant containing a moisture or an oil, it is possible to decompose the moisture or the oil during the wire manufacturing process by a wire heating means or the like described later. By this or other methods, it is possible to remove the moisture or the oil.

Further, in the present invention, the respective steps of the step of removing the lubricant from the drawn wire by a physical means, and the step of coating a lubricant for wire feeding on the wire surface are also carried out through an in-line process. This increases the speed of the overall FCW manufacturing process. Then, simultaneously, the forming resulting in a hydrogen source for a product FCW and the introduction of the wire drawing lubricant are inhibited, and the wire feedability of the product FCW is ensured. Incidentally, in the present invention, the wording "the foregoing respective steps are carried out through an in-line process" denotes as follows. Namely, while transporting the wire, the foregoing respective steps are continuously and sequentially carried out on the wire being transported.

With the manufacturing method as described above, it is possible to increase the speed of the foregoing wire drawing process, or preferably the respective steps from the step of forming the band steel to the wire drawing step, and the wire drawing speed of the FCW, and to reduce the amount of moisture or hydrogen to be absorbed by the FCW. Further, it is also possible to enhance the productivity of the FCW. As a result, even when it is difficult to control the moisture content in the atmosphere in the wire drawing process to a very small content, and the moisture content (humidity) of the atmosphere is high, it is possible to prevent the increase in the amount of moisture (contained in the flux, and to be absorbed on the wire surface) of the whole wire during drawing to such a degree as to cause welding defects. This is because the manufacturing method of the present invention can make the total amount of hydrogen (contained in the flux, and present on the wire sheath surface) of the whole wire after drawing to 500 ppm or less with the moisture content conversion calculation method described later. As a result, it is possible to prevent the welding defect due to the occurrence of the porosity in weld metal during welding using a FCW.

Whereas, by carrying out the wire drawing process by means of a roller die made of a cemented carbide tool, the finish ability of the surface of the FCW after drawing is ensured, and the wire feedability of the FCW is improved even when the hardness of the steel hoop has been increased by the selection or the work-hardening of the band steel material. In the present invention, a conventional mild steel, a high tensile strength steel, a Ni base alloy steel, a stainless steel, or the like is appropriately selected as the material for the band steel according to the steel targeted for welding of the product FCW. Out of these, the high strength steel such as the high tensile strength steel, the Ni base alloy steel, or the stainless steel requires a larger working force, so that a large load is applied on the die. Accordingly, the die vibrates, or the wire vibrates thereby, and comes in contact with the die, particularly easily resulting in chatter marks on the wire. The present invention also has the following effect. Namely, even for such a hoop which is difficult to draw, wire drawing is easy, and the speed thereof can be increased.

BRIEF DESCRIPTION OF THE DRAWINGS

FIG. 2 is a front view showing one embodiment of a roller die wire drawing device for use in the present invention;

DETAILED DESCRIPTION OF THE INVENTION

Figure 1A:
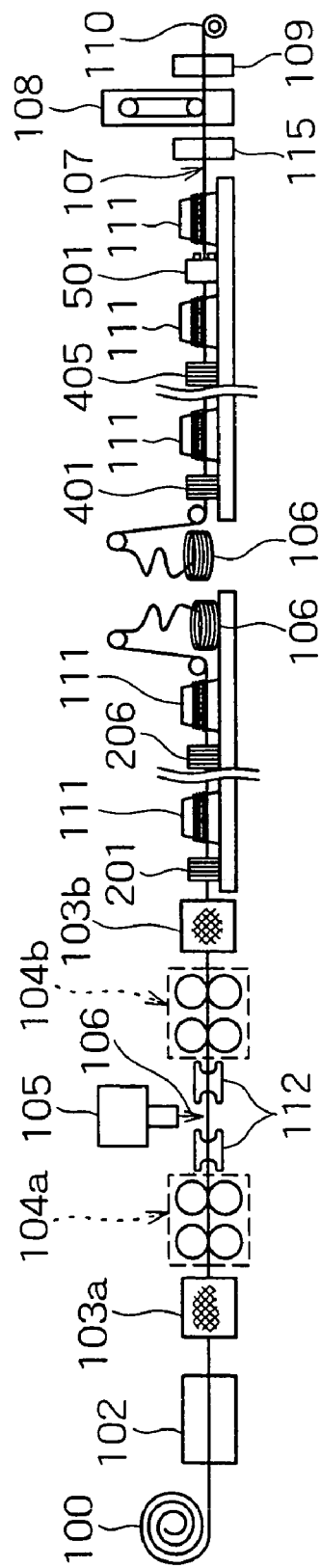
FIG. 1A is an explanatory view showing the process outline of a method for manufacturing a seamed flux-cored welding wire of the present invention.
Figure 1B:
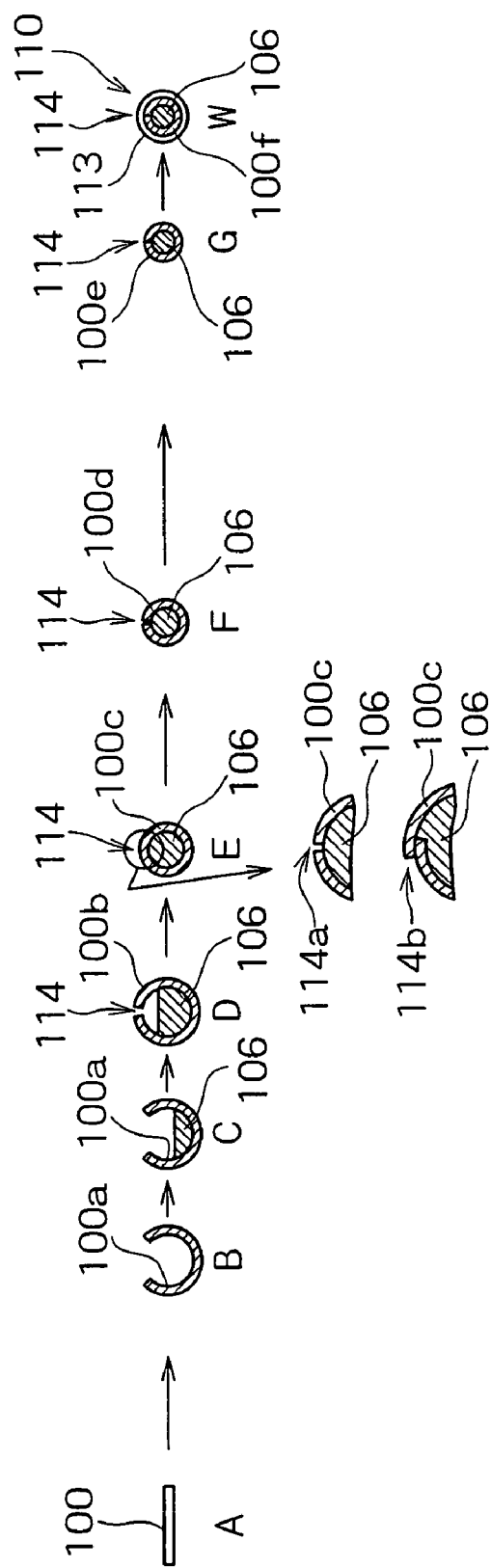
FIG. 1B is an explanatory view showing the cross sectional shape of a hoop in each forming step of FIG. 1A.

Below, the present invention will be described by way of embodiments with reference to the accompanying drawings. FIG. 1A is an explanatory diagram partly in plan schematically showing a step of a manufacturing method of a seamed flux-cored wire of the present invention. FIG. 1B is an explanatory diagram showing a cross sectional shape of a hoop in each forming step of FIG. 1A. FIG. 2 is a front view showing roller dies made of a cemented carbide tool for use in the present invention.

The steps of the manufacturing method of the seamed flux-cored wire of the present invention will be described below.

(Cleaning and Degreasing Step)

In FIG. 1A, a coil-like band steel 100 uncoiled by an uncoiler not shown is, first, cleaned and degreased in advance by a cleaning and degreasing step 102. The working oil and contamination attached on the surface when a broad material steel sheet was slitted along the direction of width into the narrow band steel 100 are removed by the cleaning and degreasing step 102. Even a small amount of the working oil attached on the surface of the band steel 100 may result in a hydrogen source causing arc instability during welding and welding defects such as porosities. Therefore, the cleaning and degreasing step 102 are preferably carried out.

(Band Steel)

In this case, the ratio t/W of the thickness t of the band steel to the width W of the band steel is preferably set within a range of 0.06 to 0.12. The board thickness t and the width W of the band steel (hoop) are naturally determined by the wire diameter of the product FCW. However, according to the findings of the inventors, the ratio t/W of the thickness t of the band steel to the width W of the band steel also affects the low hydrogen content characteristic of the FCW. Namely, when the t/W is less than 0.06, and too small, the band steel or the wire becomes unable to hold such a strength as to withstand forming or wire drawing with the flux filled therein. This facilitates the occurrence of breakage. For this reason, the forming or wire drawing speed becomes slow. Accordingly, when it is difficult to control particularly the moisture content in the atmosphere in the wire drawing step to a trace amount according to the environment for the production of the FCW, there is a high possibility that the amount of moisture absorbed by the wire (flux) during wire drawing increases to such a degree as to cause welding defects. Further, the wire feedability is also reduced.

On the other hand, conversely, when the ratio t/W of the thickness t of the band steel to the width W of the band steel exceeds 0.12, and too large, the working degree in the wire drawing step increases excessively. For this reason, the chemical or physical alteration such as the oxidation or the powdering of the flux due to the working heat proceeds. As a result, the moisture content increases, or breakage becomes more likely to occur. Therefore, in order to produce a FCW having a favorable low hydrogen content characteristic, the ratio t/W of the thickness t of the band steel to the width W of the band steel is preferably set within a range of 0.06 to 0.12 in consideration of the problem of the moisture absorption during the wire drawing.

(Lubricant)

In FIG. 1A, the band steel 100 after cleaning and degreasing is coated with a trace quantity of the non-hydrogen-bearing lubricant or an anticorrosive oil only on the surface which will be the FCW surface (wire surface) of the band steel 100 in a lubricant coating step 103a. Subsequently, in the respective steps of the step of forming a band steel, a step of forming from a U-shaped band steel to a tube-like wire, and a wire drawing step, a wire drawing lubricant containing a sulfur-bearing high-pressure lubricant is used. As the wire drawing lubricant, a lubricant containing a sulfur-bearing lubricant as a non-hydrogen-bearing lubricant, a wet lubricant containing a sulfur-bearing high-pressure solid as a component and water as a solvent, an oil lubricant containing a sulfur-bearing high-pressure solid as a main component, and a small amount of oil component, or the like is appropriately selected and used.

The high-pressure lubricant denotes a lubricant having a property of forming the shape of a film even under high pressure. The term "sulfur-bearing" denotes "consisting of a substance containing a sulfur atom".

The dry lubricants not containing a sulfur-bearing lubricant, but containing other high-pressure lubricants such as soaps of an alkali metal type typified by sodium stearate and an alkaline earth metal type, carbon fluoride, TEFRON (registered trademark), and boron nitride, and the wet lubricants are inferior in lubricating performances as compared with the wire drawing lubricants containing a sulfur-bearing high-pressure lubricant of the present invention.

For this reason, when wire drawing is carried out at a higher speed, particularly, it becomes necessary to use a wire drawing lubricant in a large amount. As a result, it becomes very difficult to carry out substantial removal of the lubricant by a physical means such as wiping off of the oil lubricant from the surface of the wire running in an in-line state after wire drawing. Further, the lubricant tends to remain on the wire surface, which causes arc instability during welding, and results in a hydrogen source causing welding defects due to porosities.

In contrast, the wire drawing lubricant containing a sulfur-bearing high-pressure lubricant of the present invention is excellent in lubricating performances. Therefore, even when wire drawing is carried out at a higher speed, only a small amount of the wire drawing lubricant is required to be used. When the amount is expressed as the amount of the lubricant deposited in terms of the sulfur amount on the wire surface after wire drawing, the residual amount of the lubricant on the wire surface after wire drawing is about 0.1 to 0.6 g per 10 kg of the wire. With such a degree of the lubricant residual amount, it is possible to carry out the following and subsequent step of removing the lubricant by a physical means in conjunction with high-speed wire drawing continuously through an in-line process, and at a high speed.

The dry type wire drawing lubricants containing a sulfur-bearing high-pressure lubricant include molybdenum disulfide, tungsten disulfide, zinc sulfide, and the like. Alternatively, it may also be a dry type wire drawing lubricant containing the sulfur-bearing high pressure solid as a main component, and an additive such as a carrier agent including naphthalene, titanium oxide, mica, graphite, calcium carbonate, calcium fluoride, or the like added thereto.

The dry type lubricant denotes not being a wet lubricant containing liquid water or oil component. What material is used as the lubricant affects the amount of moisture absorbed in the whole wire. Therefore, it is desirable in the present invention that the sulfur-bearing high-pressure lubricant itself is of a dry type.

Alternatively, it may also be a semi-wet type wire drawing lubricant prepared by further adding a small amount of an oil solvent such as polyisobutene (synthetic oil), or a rapeseed oil (vegetable oil) to the dry type wire drawing lubricant.

The preferred composition range of the wire drawing lubricant for the acquirement of excellence particularly in lubricating performance, the increase in the wire drawing speed, the reduction in the hydrogen content of the wire, and the removal in the in-line process is as follows: one, or two or more sulfur-bearing metal compounds such as molybdenum disulfide, tungsten disulfide, and zinc sulfide, 20 to 80 mass %; the one, or two or more carrier agents, 40 to 50 mass %; and the one or two or more oil solvents, 5 to 40 mass %. Further, when a small amount of a metal soap is further added thereto, it is possible to improve the wire drawing productivity.

In addition, the one containing a sulfur-bearing high-pressure lubricant in a form dispersed or dissolved, if required, with the carrier agent or the like, in a solvent such as water, an animal or vegetable oil, a mineral oil, or a synthetic oil is appropriately used within such a range as to satisfy the required characteristics as the wire drawing lubricant, and as not to inhibit the required characteristics. Examples of the sulfur-bearing high-pressure lubricant include sulfur-bearing metal compounds such as molybdenum disulfide, tungsten disulfide, and zinc sulfide, and sulfur-bearing synthetic oils such as olefin sulfide and sulfurized fats and oils. Examples of the solvent include water, animal and vegetable oils (such as palm oil, rapeseed oil, coconut oil, and castor oil), mineral oils (such as machine oil, turbine oil, and spindle oil), and synthetic oils (such as hydrocarbon type, ester type, polyglycol type, polyphenol type, silicone type, and fluorine type). However, these are also preferably selected from non-hydrogen-bearing compounds as much as possible. The preferred composition range is as follows: a sulfur-bearing lubricant in the range of 20 to 80 mass %; a carrier agent in the range of 40 to 50 mass %; and a solvent in the range of 5 to 40 mass %.

(Forming)

The band steel 100 thus coated with the lubricant is formed from its planar cross sectional shape shown in FIG. 1A into a band steel 100a which is U-shaped in cross section shown in FIG. 1B at a forming roller row (group) 104a. The forming roller row (group) 104a shown in FIG. 1A shows an example in which two forming rollers are arranged in series. The number of the forming rollers to be arranged in the forming step is appropriately selected according to the forming conditions such as the width, thickness, or hardness of the band steel 100.

(Flux Filling)

The band steel 100a formed in a U shape in cross section then receives a flux 106 from a flux supply device 105. Thus, as indicated with C of FIG. 1B, the flux 106 is filled (included) in the U-shaped space of the band steel 100a with a given inside filling ratio (void ratio) ensured. The usable flux supply device 105 is a belt feeder, a smooth auto feeder, a table feeder, a syntron feeder, or the like.

The filling ratio (apparent void ratio: $\zeta$) of the flux 106 into the U-shaped formed band steel 100a is expressed as the following equation:

$$\zeta(\%) = [1 - (\kappa\rho/\sigma\lambda)] \times 100$$

where ρ denotes the bulk density (g/cm$^3$) of the flux, σ denotes the inside space area (cm$^2$) to be filled with the flux at a time point E in the forming step, λ denotes the hoop running speed (cm/min) at the time point E, and κ denotes the rate of the amount (g/min) of the flux charged from the flux supply device 105.

Then, the apparent void ratio ζ is selected from the following points of view. Namely, when the filling ratio of the flux 106 is too high, i.e., when the apparent void ratio ζ is less than 0 to 3%, breakage tends to occur in the subsequent forming step or wire drawing step. Whereas, even when the wire can be drawn to a FCW at a relatively slow wire drawing speed, bubbling of the flux 106 off from the seam portion 114 tends to occur at the time of FCW feeding during welding, which reduces the feedability. Conversely, when the filling ratio of the flux 106 is too small, and the apparent void ratio ζ exceeds 10%, the flux 106 moves during wire drawing, so that the flux ratio along the direction of the length of the wire changes, resulting in a reduction in welded product quality characteristics. Therefore, when the apparent void ratio ζ falls within the range of 3 to 10%, the flux filling ratio along the direction of the length of the wire less changes. As a result, it is possible to manufacture a seamed flux-cored welding wire of favorable quality characteristics. In this respect, particularly, the apparent void ratio ζ is more desirably within the range of 5 to 7%.

Whereas, the moisture of the flux 106 to be supplied to the U-shaped formed band steel 100a is preferably dried (heated at 110° C. to 250° C.) during supply over the flux supply device 105 before supply (inclusion) to previously control the moisture content in the flux within the range of 500 ppm or less. Alternatively, the flux may also be previously dried in an off-line process (preliminary batch processing). However, in order to minimize the number of manufacturing steps, the process in which drying is carried out over the flux supply device 105 is preferably adopted as means for removing the moisture through the in-line process. Specifically, heating is carried out by a heater or the like in a flux supply path (passage) of the flux supply device 105. Further, if possible, it is also effective that the whole manufacturing line (factory) for the FCW is air-conditioned at a relative humidity of 70% or less, and more preferably 60% or less.

The U-shape formed band steel 100a thus filled with the flux 106 is then further formed into a tube-like wire 100b indicated with D of FIG. 1B by a forming roller row 104b. The conditions for the forming roller row 104b are the same as with the forming roller row 104a. The tube-like wire 100b has a gap portion=seam 114 at which the opposite ends along the direction of width of the band steel is close to each other over the direction of length of the wire 100b. The seam 114 still exists as the gap portion even when the wire 100b has been reduced in diameter to be a wire 100c, and a wire 100d through the subsequent wire drawing step. Specifically, even when the wire 100c has a cross section 114a of a butt type, indicated on an enlarged scale with an extension line from the wire 100c (or E) of FIG. 1B, and the opposite ends along the direction of width of the band steel are butted, the seam 114 exists. Alternatively, as another embodiment, even when the wire 100c has a cross section 114b of lap type, similarly indicated on an enlarged scale with an extension line from the wire 100c (or E) of FIG. 1B, and the opposite ends along the direction of width of the band steel overlap each other, the seam 114 exists. This also holds for a product FCW.

(Wire Drawing Lubrication)

The formed tube-like wire 100b is then coated with the lubricant of the present invention on the surface of the wire 100b in a lubricant coating step 103b, followed by wire drawing. The lubricant may be either the same as, or different from the lubricant in the coating step 103a so long as it falls within the scope of the present invention. Herein, the lubricant coating steps may be not only set at 103b before wire drawing, but also set appropriately during the wire drawing step according to the wire drawing conditions. At this step, the amount of the lubricant to be deposited on the surface of the wire 100b to be drawn is preferably set to be the residual amount within a range of 0.1 to 0.6 g per 10 kg of the wire, including the amount of the lubricant which has been previously applied in the lubricant coating step 103a, and remains on the surface of the wire 100c in terms of the amount of sulfur on the wire surface after drawing in the wire 100e of FIG. 1B or in the wire 107 of FIG. 1A after completion of wire drawing.

When the residual amount of the lubricant deposited is less than 0.1 g in terms of the sulfur amount, the lubrication becomes insufficient for high-speed wire drawing. As a result, the wire to be drawn becomes more likely to undergo burning or breakage. On the other hand, when the residual amount of the lubricant deposited exceeds 0.6 g in terms of the sulfur amount, the excess amount of the lubricant is unnecessary from the viewpoints of forming and wire drawing lubrication, and it becomes difficult to carry out the removal of the lubricant by the following and subsequent physical means continuously in conjunction with high-speed wire drawing at high speed. Therefore, the lubricant becomes more likely to remain on the FCW surface, which inhibits the arc stability during welding.

(Roller Die Wire Drawing)

Below, a roller die wire drawing step of FIG. 1A will be described. The wire drawing step of FIG. 1A can be broadly divided into a primary wire drawing step and a secondary wire drawing step. With the wire drawing step, the wire is reduced in diameter to the product diameter or a wire diameter close to the product diameter. Herein, as indicated with E and F of FIG. 1B, the wire is reduced in diameter from the wire 100c to the wire 100d by the primary wire drawing. Further, as indicated with F and G of FIG. 1B, the wire is reduced in diameter from the wire 100d to the wire 100e of the product diameter by the secondary wire drawing.

The wire drawing step of FIG. 1A shows an embodiment in which the primary wire drawing step and the secondary wire drawing step are carried out separately from each other. Thus, whether the wire drawing step is divided, or the primary wire drawing step and the secondary wire drawing step are carried out continuously through the same process to draw the wire to the product diameter is appropriately selected according to the design conditions of the band steel, the design conditions of the product FCW, the productivity, or the like. Further, a plurality of lines of the secondary wire drawing steps (C) may be set per line of the primary wire drawing step (B). Alternatively, one line of the secondary wire drawing step (C) may also be set per a plurality of the primary wire drawing steps (B). Either the former setting or the latter setting may be appropriately selected according to the productivity balance between the primary wire drawing and the secondary wire drawing.

For the primary wire drawing step, roller die rows (groups) 201 to 206 made of super hard materials are arranged in multiple stages (6 stages or 6 groups in the example of FIG. 1A). For the secondary wire drawing step, roller die rows (groups) 401 to 405 made of super hard materials are arranged in multiple stages (5 stages or 5 groups in the example of FIG.

1A). The number of the multiple stages of the roller die rows to be arranged is also appropriately selected according to the wire drawing conditions.

The primary wire drawing step of FIG. 1A is continuous to the forming step in an in-line manner. Then, the wire after the primary wire drawing is once wound around a coil 106. Further, as shown in FIG. 1A, the wire around the coil 106 is uncoiled to carry out the secondary wire drawing step.

The secondary wire drawing step is continuously followed by the lubricant physical removing means (steps) 115+108, and the oil coating means 109 in an in-line manner. Alternatively, a skin pass finishing wire drawing step by a hole die 501 may also be inserted prior to the wire drawing lubricant coating step.

In the present invention, the steps subsequent to the wire drawing by roller dies, such as the finishing wire drawing step 501, the lubricant removing steps 115+108, and the oil coating step 109 are carried out through an in-line process (continuously through the same line). When these steps are carried out separately through an off-line processing, the productivity and the production efficiency of the overall product FCW manufacturing process are remarkably reduced. This largely impairs the advantages of the increase in wire drawing speed by the roller die group.

In the secondary wire drawing step, the oil-coated product FCW is wound into a coiler as 110. In addition, it is further rewound into a wire spool, or charged into a pail pack through a step not shown. In the wire drawing step of FIG. 1A, a reference numeral 111 denotes a capstan. Each capstan 111 is disposed at the subsequent stage of each roller die row. Thus, it smoothly guides the wire to be drawn, thereby to ensure continuous high-speed wire drawing.

The hole die 501 is provided in order to carry out the skin pass finishing wire drawing for improving the shape accuracy such as the roundness, which is selectively performed. The finishing wire drawing by the hole die 501 is intended for the wire drawn by roller dies from the tube-like formed wire to the wire diameter immediately preceding to the product diameter. The wire diameter immediately preceding to the product diameter denotes the diameter of the wire drawn in an area ratio of 1.1 or less relative to the product wire taken as 1. Alternatively, the finishing wire drawing by the hole die may also be applied to the stage during wire drawing by a plural stages of roller dies. In this case, the final step of a series of the wire drawing steps is the wire drawing by roller dies.

Herein, the shape accuracy (such as roundness) of the product-diameter wire 1100e indicated with G of FIG. 1B affects the wire feedability. In addition, it also largely affects the workability in rewinding the FCW 110 in the wire spool 100, or charging it in a pail back in a separate step. For this reason, the wire drawn by the roller die rows is preferably subjected to finishing wire drawing by the hole die 501 finally. The wire drawing speed of the hole die is lower than with the roller dies. However, with such a secondary wire drawing line configuration, the high seed performance and the continuity of the wire drawing steps and the overall FCW manufacturing process will not be affected even when finish wire drawing is carried out by means of the hole die finally. When the finish wire drawing is carried out by means of the hole die, the wire drawn by the roller die row has a wire diameter close to the product diameter, and the wire after hole die finishing wire drawing has a final product diameter. In the present invention, the wire drawn by roller dies may have the final product diameter or the wire diameter close to the product diameter, i.e. a different diameter according to whether it has undergone hole die finishing drawing or not. The wire diameters resulting from wire drawing by means of the roller dies are generically referred to as roughly a product diameter.

(Lubricant Removing Means)

The drawn wire 100e is then subjected to removal of the lubricant from the wire surface by the physical removing means 115+108. The lubricant removing means in FIG. 1A is intended for the three-stage in-line lubricant removal by the lubricant removing means 115 (indicated with a small box) for surface polishing and striking the wire at the preceding stage, and the lubricant removing means 108 (indicated with a box in which a roll is shown) by a wiper roll at the succeeding stage. The lubricant removing means 115 for surface polishing and striking the wire is means for surface polishing the running wire, and then, for example, causing a lightweight piece to drop on a running wire, and to strike the wire, and thereby removing the lubricant from the wire surface. Whereas, the lubricant removing means 108 by the wiper roll at the succeeding stage is means for removing the lubricant from the wire surface by the wiper roll provided with a felt for wiping off the lubricant on the surface.

In addition, the in-line lubricant removal may be carried out in the following manner. Namely, the lubricant may be removed by another physical removing means such as shaking of the wire, or the appropriate combination of these physical removing means.

When the lubricant has not been removed, and has remained on the wire or the FCW surface, the arc stability during welding is reduced, and welding defects are caused. Incidentally, in addition to the physical removing means for removing the lubricant, for example, an in-line step of spraying 40±10° C. warm water on the wire surface, or dipping the wire in warm water or hot water, and removing the lubricant by cleaning may also added, if required, at the preceding stage or at the succeeding stage of the physical removing means. However, for the dipping and cleaning, moisture tends to enter into the wire through the seam portion. Therefore, in order to remove this, preferably, the wire is passed through an in-line induction heating coil, so that the wire is heated by a high frequency electromagnetic induction current to reduce the total moisture content of the wire.

In the present invention, by using the wire drawing lubricant containing the sulfur-bearing high-pressure lubricant as the lubricant for the forming and drawing steps, the lubricant becomes more likely to be removed from the wire surface by the physical removing means even without using the chemical lubricant removing means such as a cleaning agent. As a result, the removal of the lubricant by the physical means can be carried out in conjunction with the high-speed wire drawing of the preceding stage continuously and at a high speed. As described above, when other lubricants are used, the removing efficiency from the wire surface is largely reduced, and the necessity of using a chemical lubricant removing means is caused. Accordingly, it becomes difficult to carry out the manufacturing of the FCW continuously and at a high speed in conjunction with the preceding-stage high-speed wire drawing.

(Oil Coating Means)

The wire 100e from the surface of which the lubricant has been removed is subsequently coated on the wire surface with a lubricant 3 such as a lubricant for improving the wire feedability by the oil coating means 109 as indicated with W of FIG. 1B, resulting in a FCW product. Herein, the oil coating means 109 is required to coat a small amount of a lubricant uniformly and for a short time on the surface of the wire being carried (moving) at a high speed as shown in FIG. 1B. To this end, use of a forced oil coating means such as electrostatic oil coating is preferred from the viewpoint of the total hydrogen control of the wire. However, a process in which a felt impregnated with the lubricant 3 is brought in contact with the wire for coating is generally adopted.

However, although the FCW feedability improving lubricant is indispensable for improving the wire feedability, it serves as a hydrogen source. For this reason, it is deposited in a minimum required amount for improving the wire feedability. The lubricant is preferably the one capable of providing favorable wire feedability when coated in a small amount. For example, a vegetable oil such as a rapeseed oil containing triglyceride or a synthetic oil such as polyisobutene is suitable.

The embodiment of FIG. 1A described above shows the following embodiment. The process including the step of forming the band steel in a U shape, the step of filling a flux in the U-shaped formed band steel, the step of forming from the U-shaped band steel to the tube-like wire, and the primary drawing step of the tube-like formed wire, and the process including from the secondary wire drawing step to the step of coating the wire feeding lubricant on the wire surface are all respectively carried out through the same continuous line (in-line). However, it is also acceptable, according to the production efficiency and the production conditions of the FCW manufacturing line, that the primary wire drawing step and the secondary wire drawing step are connected, and that all these are carried out through the same in-line process. Alternatively, the steps up to the primary wire drawing step may also be further divided to be carried out separately. For example, the steps up to the step 104b of forming the wire into a tube-like wire and the primary wire drawing step of the tube-like formed wire may also be carried out through separate lines.

(Roller Die Wire Drawing Device)

Figure 3:
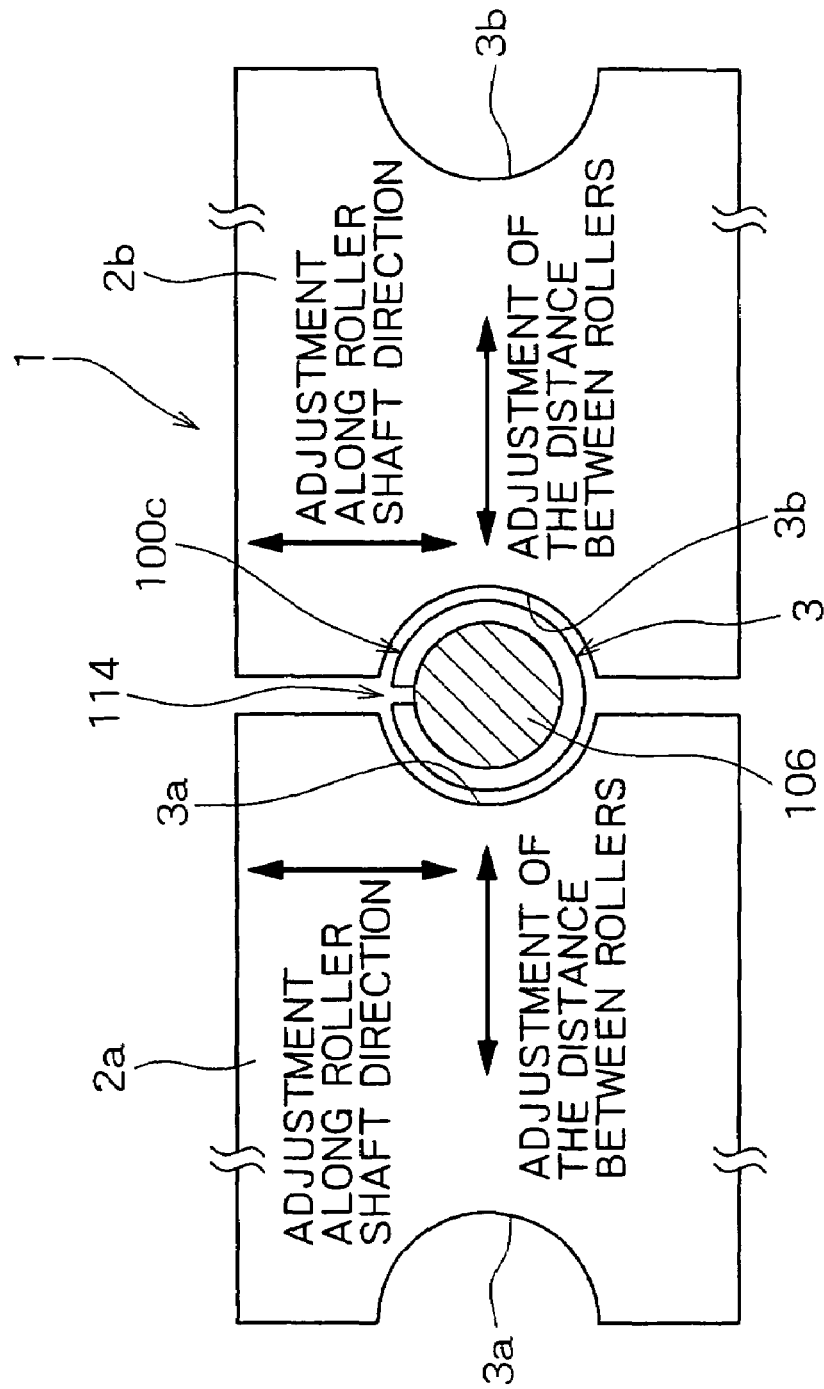
FIG. 3 is a front view of an essential part on an enlarged scale of the roller die of the wire drawing device of FIG. 2.
Figure 4:
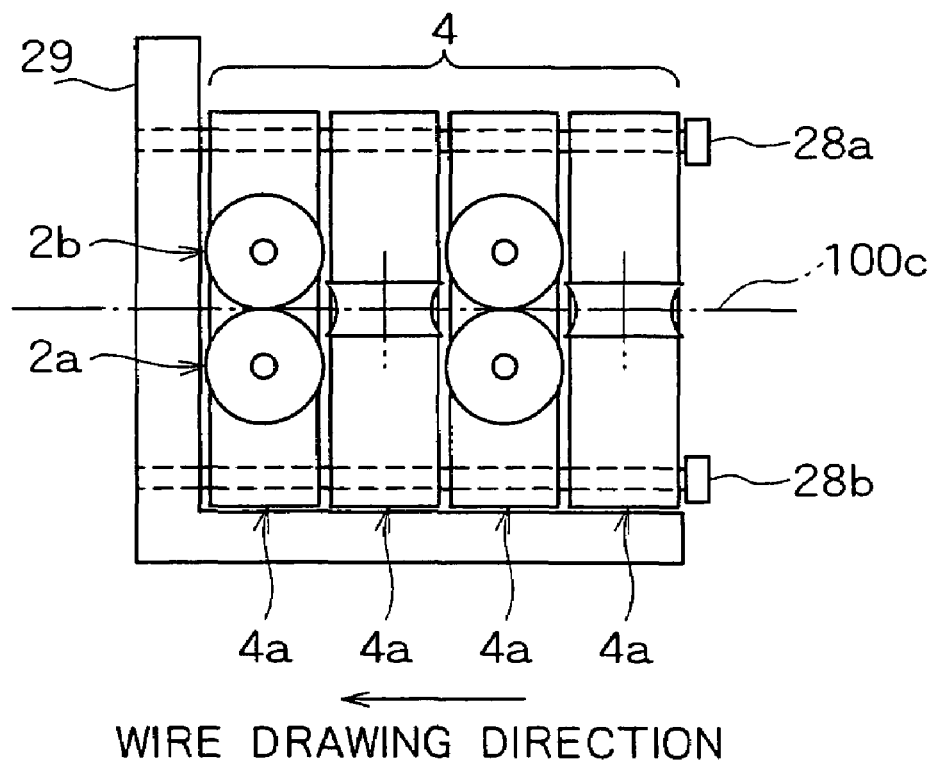
FIG. 4 is a front view showing a roller die wire drawing device row for use in wire drawing.

Herein, the configuration of roller dies (roller die wire drawing device) will be described by reference to FIGS. 2 to 4. FIG. 2 is a front view of a wire drawing device of a preferred embodiment. FIG. 3 is a front view on an enlarged scale of an essential part of a roller die in the wire drawing device of FIG. 1. FIG. 4 is a front view showing a roller die wire drawing device row for use in wire drawing. Incidentally, the embodiment of the preferred basic configuration of the roller die wire drawing device is based on the increase in rigidity of a framework body supporting the roller die described later.

First, in FIG. 2, a roller die wire drawing device 4a is basically composed of a roller die 1, bearing boxes (bearing covers) 7a, 7b, 7c, and 7d, bearing fixing beams 8a and 8b, integral type rectangular framework units 9a, 9b, 9c, and 9d, and the like. The material for respective framework units forming the integral type rectangular framework units is preferably composed of a relatively high strength steel such as a carbon steel for a machine structure, an alloy steel, a stainless steel, or a tool steel.

The roller die 1 is composed of a pair of two, right and left, rollers 2a and 2b. The shafts 6a and 6b of the respective rollers 2a and 2b are rotatably pivoted by bearings (not shown) in the bearing boxes 7a, 7b, 7c, and 7d, respectively. The bearings are held and accommodated in the four bearing boxes 7a, 7b, 7c, and 7d, respectively. The bearing boxes 7a and 7c, and the bearing boxes 7b and 7d are coupled and fixed to the two bearing fixing beams 8a and 8b, respectively. These are respectively fixed to the four framework units 9a, 9b, 9c, and 9d via these beams. These bearing fixing beams 8a and 8b are fixed via bolts for adjustment each described later to the framework units 9a, 9b, 9c, 9d, respectively.

In FIG. 2, reference numerals 11a, 11b, 11c, and 11d are bolts for adjusting the position in the roller shaft direction of the roller die 1 (the vertical direction of the figure). Reference numeral 12a and 12b, and 13a, 13b, 13c, and 13d denote bolts for adjusting the roller gap (distance between the rollers). These bolts for adjustment are each composed of a push screw, a pull screw, and the like, and joined to the framework units 9a, 9b, 9c, and 9d, and the bearing fixing beams 8a and 8b, respectively. Then, these bolts control the position in the roller shaft direction and the roller gap of the rollers 2a and 2b relative to the welding wire during wire drawing via the bearing fixing beams and the bearing boxes fixed in the beams. This controls the load of the roller die on the welding wire and the working ratio thereof, and the shape and the diameter of the welding wire.

On the other hand, the framework units 9a, 9b, 9c, and 9d supporting and enclosing the roller die 1 are joined to one another by a bolt 10 group, and the like, thereby to configure a integral type rectangular framework body. The whole shape of the integral type framework body reasonably is generally a rectangle for supporting the roller die 1 from four directions. Reference numerals 27 denote a hole group for fixing shafts for stacking and fixing wire drawing devices 4a when the wire drawing devices 4a are used as a wire drawing device row (group) 4 in which a plurality of the wire drawing devices 4a are arranged in series with respect to the welding wire 5. These holes for a fixing shaft 27 are respectively arranged at the four corners (the corner portions of the framework units 9a and 9c) of the integral type framework body so as not to inhibit the configuration and the functions of the wire drawing devices 4a.

A pair of left and right roller 2a and 2b constituting the roller die 1, shown on an enlarged scale in FIG. 3, has half-round cavities 3a and 3d, respectively. Then, a wire (the one shown is the wire 100c of FIG. 1B) is held in a die hole 3 integrally formed of the die cavities 3a and 3b. Thus, for example, the wire 100c filled therein with the flux 106 of FIG. 1 is drawn. At this step, the positions along the roller shaft direction (the vertical direction of the figure) of the rollers 2a and 2b are adjusted by the bolts 11a, 11b, 11c, and 11d of FIG. 2. Whereas, the roller gap (the horizontal direction of the figure) is adjusted by the bolts 12a and 12b, and the bolts 13a, 13b, 13c, and 13d of FIG. 2.

The foregoing preferred basic configuration basically facilitates the ensuring of the required rigidity of the integral type rectangular framework units 9a, 9b, 9c, and 9d, and the fixing strength of the roller die 1 during drawing, corresponding thereto. Therefore, even for the drawing of a high strength welding wire, it is possible to prevent the deformation of the integral type rectangular framework units 9a, 9b, 9c, and 9d. This further increases the fixing strength of the roller die 1, which can improve the wire drawing speed and the shape accuracy even for the drawing of a high-strength welding wire.

The fixing strength (rigidity) of the roller die 1 in the wire drawing device 4a is determined by the mutual synergism among the strengths of the constituent elements themselves of the roller die 1, the bearing box 7, the bearing fixing beam 8, and the rectangular framework body 9, the fixing strength on the rectangular framework body, and the strength of the rectangular framework body. In the present invention, particularly, the strength (the rigidity) of the most influential integral type rectangular framework body 9 out of these elements is enhanced to the prescribed level, thereby to increase the fixing strength of the roller die 1. Therefore, even with a wire drawing device 4a of such a preferred basic configuration, as described later, particularly, the rigidity of the integral type framework body and the fixing strength of the roller die during the drawing of a high strength welding wire become insufficient when the elongation amount of the integral type framework body exceeds 150 μm, resulting in a reduction of the rigidity.

(Roller Die Wire Drawing Device Row)

When the wire drawing devices 4*a* of such a configuration are actually used in wire drawing for FCW manufacturing, as shown in FIG. 4, they are used as the wire drawing device row (group) 4 in which a plurality of the devices are arranged in series with respect to the welding wire 100*c*. In the case of FIG. 4, in order to draw the flux-cored welding wire 100*c* with good shape accuracy, there are alternately arranged the wire drawing devices 4*a* which have the same configuration, and of which the orientations of the rollers 2*a* and 2*b* are shifted from one another in angle by 90 degrees. Fixing shafts 28*a* and 28*b* are penetrated through the holes for the fixing shaft (the holes 27 for the fixing shafts shown in FIG. 2) of the respective wire drawing devices 4*a*. Thus, they are fixed to a fixing plate 29 (having an L shape including the support portions of the bottoms of the wire drawing devices 4*a*), and formed into a one piece as a wire drawing apparatus 4. Incidentally, the wire drawing direction in FIG. 4 is the direction of from right to left of the figure.

(Roller Die Framework Body Rigidity)

The rigidity in the framework body supporting the roller die will be described.

The integral type framework body supporting the roller die characterizing the present invention plays an important role of ensuring the rigidity of the roller die for wire drawing. When the rigidity of the integral type framework body is low, the integral type framework body deforms with ease, resulting in an increase in deformation amount. For this reason, the roller die also becomes low in fixing strength, and hence it becomes more likely to deform. As a result, the roller itself becomes more likely to vibrate when being rotated during drawing. This excites the vibration of the welding wire during drawing. As a result, the wire intermittently comes in contact with the die hole of the roller, so that chatter marks occur on the welding wire surface. This facilitates the occurrence of the following problems: the wire diameter accuracy and the shape accuracy of the welding wire are prevented from being satisfactory; the surface roughness of the wire is caused; and other problems. Particularly, this tendency is stronger for the drawing of a higher strength welding wire. For this reason, particularly high strength welding wire cannot be drawn. Alternatively, even when it can be drawn, there is no other choice but to reduce the wire drawing speed.

In contrast, as with the preferred embodiments of the present invention, by enhancing the rigidity of the integral type framework body, it is possible to prevent the framework body from deforming under the load during wire drawing. As a result, the fixing strength of the roller die is enhanced. This enables the improvement of the wire drawing speed and the shape accuracy even for the drawing of a high strength welding wire.

Figure 5A:
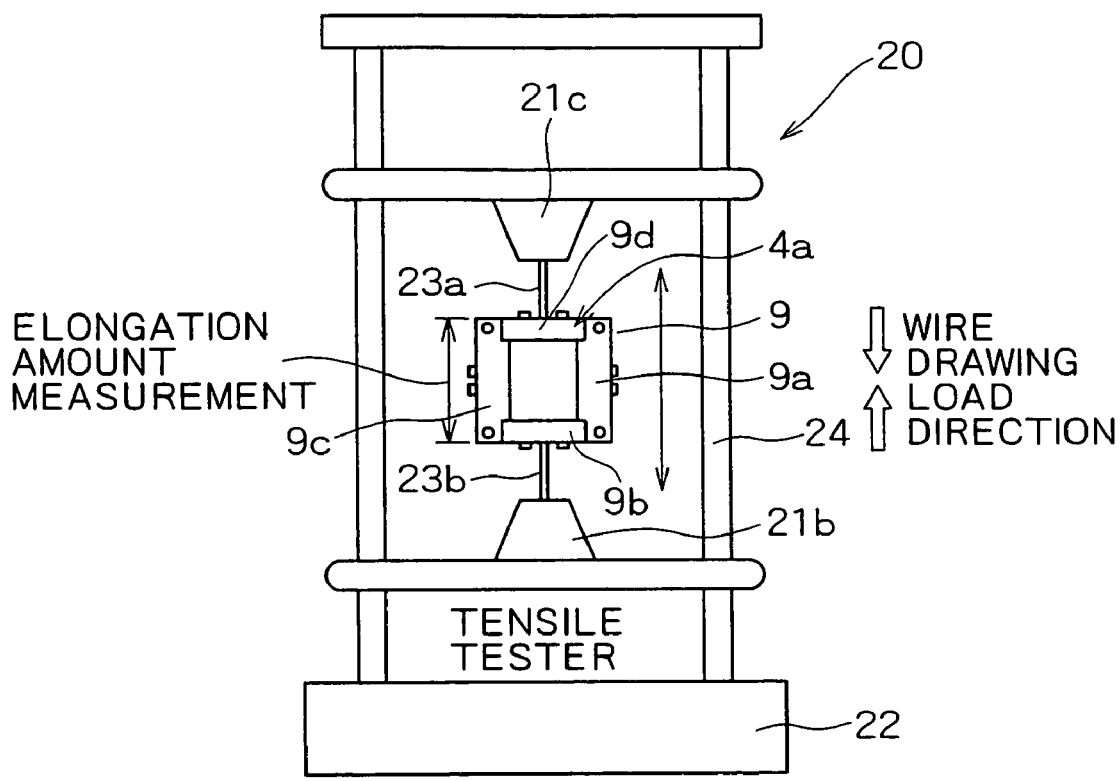
FIG. 5 is a front view showing a tensile tester of a roller die framework body.

The rigidity of the integral type framework body is expressed as the elongation amount of the framework body alone determined by carrying out a tensile test of only the integral type framework body in the wire drawing device by means of a tensile tester 20 as shown in FIG. 5A. The way that the elongation amount is measured in this manner is the most simple measuring process, and well conforms to the trend of increases in speed and accuracy in the actual drawing of a high strength welding wire.

The tensile load applied to the framework body for the tensile test is measured in the following manner. The objects to be supported by the framework body, such as the roller die and the bearing boxes are removed from the wire drawing device actually used. Then, on only the integral type of the frame body, a tensile load of 10000 N is applied to the central part of the frame body in the direction of the load on the wire of the roller die, thereby to expand the framework body. The elongation amount of the framework body at this step is measured. The elongation amount of only the integral type framework body, and the central part of the framework body denotes the maximum deformation amount of the integral type framework body when it most largely deforms. The reason why the objects to be supported by the framework body, such as the roller die and the bearing boxes have been intentionally removed therefrom for measuring the elongation amount of the framework body is as follows. The effects of these objects to be supported on the framework body rigidity are eliminated, so that the rigidity of only the framework body (the framework body alone) largely contributing to the drawing state of the high strength welding wire is evaluated.

The tensile tester 20 of FIG. 5A is basically composed of a framework member 24 set on a base 22, and tensile tester units 21*a* and 21*b* vertically set on the framework member 24, and basically has the same configuration as that of a conventional tensile tester. In short, the tensile tester 20 is different from a conventional tensile tester only in that the integral type framework body is used in place of a conventional tensile test piece, and in that the vertical mounting and fixing method the integral type framework body for the tensile test is accomplished by means of bolts 23*a* and 23*b* provided at the central parts of the framework units 9*d* and 9*b* (the upper and lower axis centers of the integral type framework body 9) in the integral type framework body 9, respectively. Incidentally, the integral type framework body 9 for the measurement of FIG. 5A is shown in such a state as to be tilted by 90 degrees with respect to the orientation of the integral type framework body 9 shown in FIG. 2 so that the tensile load direction is the direction of the load of the roller die wire drawing device on the wire.

Figure 5B:
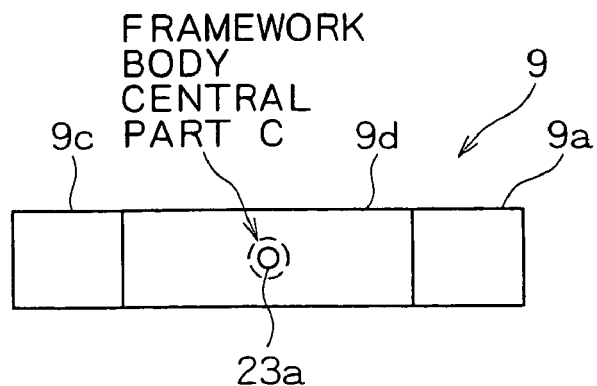

FIG. 5B is a plan view of the integral type framework body 9 (a view as seen from the top of the integral type framework body 9). As shown in FIG. 5B, the tensile load is applied at the central part of the framework unit 9*d*, which is the vertical axis of the integral type framework body 9, or the position close to the vertical axis. When there have already been the bolts for adjusting the position as the wire drawing device at the central part c of the framework unit 9*d*, these may be utilized, and fixed in place of the fixing bolt 23*a* for the tensile test. Alternatively, when there is no fixing bolt or no bolt hole for the tensile test, another hole for inserting therein the fixing bolt 23*a* for the tensile test is provided at the central part c of the framework unit 9*d*. The same also holds for the other framework unit 9*b*. Incidentally, in any of these cases, it is needless to say that the fixing bolt for the tensile test is required to have such a thickness and a strength as to satisfactorily withstand the tensile load of 10000 N.

Then, L1−L0 is determined, where L0 denotes the outline distance of the framework body (along the direction of the vertical axis of the framework body 9) at the central part of the framework body 9 before the tensile load is applied thereto, and L1 denotes the framework length at the center of the framework body after the tensile load has been applied thereto. The determined value is taken as the elongation amount of the framework outline distance. The elongation amount of the only the integral type framework body 9 denotes the maximum deformation amount of the integral type framework body 9 when the framework body 9 most largely deforms as described above. The distances L0 and L1 are measured in unit of μm by means of a micrometer, a laser type distance meter, a dial gauge, a distortion type gap measuring device, or the like.

In the present invention, the integral type framework body 9 preferably has a high rigidity such that the elongation amount of the integral type framework body 9 in such a tensile test falls within a range of 20 to 150 μm. For example, in the case where, in even one group (one row) of roller dies out of the plurality of groups of roller dies in the wire drawing step, the elongation amount of the integral type framework body exceeds 150 μm, the rigidity of the integral type framework body and the fixing strength of the roller dies become insufficient when a particularly high strength welding wire is drawn. This facilitates the occurrence of the following problems: chatter marks occur on the wire during drawing; the wire diameter accuracy and the shape accuracy are prevented from being satisfactory; the surface roughness of the wire is caused; and other problems. This tendency is stronger for the drawing of a particularly higher strength welding wire. For this reason, particularly high strength welding wire cannot be drawn. Alternatively, even when it can be drawn, there is no other choice but to reduce the wire drawing speed. As a result, it is not possible to achieve both the increase in speed and the enhancement in accuracy (enhancement in shape accuracy) for the drawing of a particularly high strength welding wire.

On the other hand, when the elongation amount of the integral type framework body is less than 20 μm, the load on the roller die is increased excessively even for the drawing of the FCW of a mild steel hoop which is relatively easy to draw. For this reason, even when the roller die is made of a WC—Co system super hard material, the roller die is reduced in fatigue strength, and becomes more likely to be broken, resulting in a large reduction of its life. Therefore, the elongation amount of the integral type framework body is set within a range of 20 to 150 μm.

Since the roller die (wire drawing device) for use in the present invention has such a configuration, the shear strength applied on the lubricant layer of the die surface is relatively small and the problem of lubricant film breakage is less likely to occur, as compared with wire drawing using a hole die in which the wire is passed through a single small-diameter hole. Whereas, also when the lubrication of the drawn wire is carried out by a non-hydrogen-bearing inorganic dry lubricant which will not cause the problem of the increase in hydrogen, the problems of solidification and clogging as with the hole die will not occur.

(Roller Die Material)

The roller die 1 (rollers 2a and 2b) for use in the present invention is preferably made of a super hard material. With other materials, for the particularly high strength and high seed welding wire drawing, the roller die is reduced in fatigue strength, and becomes more likely to be broken, resulting in a large possibility that the life is largely reduced. The super hard materials include the ones made of a WC base cemented carbide, made of a TiC base cemented carbide, made of a TiCN base cermet, and the like. There are a very large number of ones prepared by appropriately dispersing ZrC, HfC, TaC, NbC, VC, $Cr_3C_2$, and the like in the super hard materials, and sintering the dispersion with Co and/or Ni as a binder, and the like.

However, for the roller die 1 to be used in the present invention, out of these super hard materials, the one of a composition resulting from the sintering of fine WC particles having a particle diameter of 0.1 to 20 μm with Co, or Co and Ni as a binder is preferred. Such a roller die made of a WC—Co system super hard material which is a WC base cemented carbide is high in hardness and rigidity. When it is used for wire drawing, the reduction of the wire feedability will not occur. Thus, even when the hardness of the steel hoop increases, the finish ability of the FCW surface after wire drawing is ensured, resulting in an improvement of the wire feedability of the FCW. This enables a higher speed and more continuous wire drawing than with the hole die. Incidentally, in the present invention, the one with a composition of 10 mass % binder component and 90 mass % WC particles is used in examples described later. However, the preferred component composition ranges are: binder component 5 to 15 mass %, and WC particles 85 to 95 mass %.

Incidentally, the same also holds for the hole die for use in the present invention. Therefore, the respective hole dies for use in the present invention are preferably made of super hard materials, especially, WC—Co base super hard materials.

(Wire Surface Hardness After Finishing Wire Drawing)

Under these circumstances, any band steel made of a conventional mild steel sheet ensures the finish ability of the FCW surface after wire drawing so long as it has a hardness in the range of 170 to 240 Hv in terms of the Vickers hardness. As a result, the coefficient of friction is reduced, resulting in the improvement of the wire feedability of the FCW. With any roller die made of the WC base cemented carbide for use in the present invention, such a Vickers hardness range is easy to obtain. At a Vickers hardness of less than 170 Hv, the stiffness of the FCW is reduced, resulting in a reduction of the wire feedability. Conversely, at a Vickers hardness of more than 240 Hv, the FCW becomes more likely to break. As a result, when the FCW breaks at the beginning (on the winding start side) of the spool coil, the rewinding trouble of the FCW occurs.

In this embodiment, throughout the respective steps of the wire drawing process except for finishing wire drawing, wire drawing is carried out by the roller dies made of a super hard material. However, the use of other dies and roll materials than the roller dies made of a super hard material is not prevented in the part or the steps not largely affecting the high-speed and continuous wire drawing or forming.

(Conformity to the Trend of the Reduction in Moisture Content and Hydrogen Content)

Below, a description will be given to a further control means for controlling the hydrogen from each hydrogen source contained in the FCW, preferably controlling the amount of moisture (contained in the flux, and attached on the wire surface) of the whole wire after drawing to 500 ppm or less according to the high-speed and continuous, efficient FCW manufacturing process described above.

The conceivable hydrogen sources contained in the FCW are as follows:

(1) The atomic hydrogen in the sheath steel hoop, and the hydrogen contained in the composition of an anticorrosive oil, a working oil, or the like on the steel hoop surface;

(2) The crystal water of the included flux (metal powder, oxide powder, or ore powder), and the hydrogen resulting from the moisture naturally absorbed or adsorbed on the flux;

(3) The hydrogen resulting from the moisture naturally absorbed or adsorbed on the wire in the process of manufacturing of the FCW;

(4) The hydrogen source resulting from a lubricant for the wire drawing in the manufacturing of the FCW. For example, the crystal water and the adsorbed water of an inorganic type solid lubricant powder and the hydrogen contained in an oil lubricant; and (5) The hydrogen contained in a lubricant oil, an anticorrosive oil, or the like for improving the feedability to be coated on the wire surface.

In general, it is essential for the FCW, which is required to ensure the more excellent wire feedability, to be provided with some hydrogen-bearing lubricant film on the wire surface. For this reason, the hydrogen source resulting from the item (5) is indispensable as the minimum requirement. Therefore, in order to manufacture a FCW having a low hydrogen content and a favorable feedability, it is necessary to control the hydrogen from each hydrogen source comprehensively in the items (1) to (4) or (1) to (5) inclusive.

In order to reduce the amount of hydrogen of the item (1) out of each hydrogen source, the coil-like band steel 100 was first cleaned and degreased through the cleaning and degreasing step 102 in advance in the embodiment of FIG. 1.

Whereas, in order to reduce the amount of the hydrogen resulting from the supplied flux of the item (b 2), the flux was dried during supply on the flux feeder 105 before supply.

Further, in order to reduce the amount of hydrogen resulting from the moisture absorbed or adsorbed on the wire in the process of manufacturing the FCW, the wire drawing speed was increased by means of roller dies. Then, as described above, the ratio t/W of the thickness t of the band steel to the width W of the band steel is preferably set within the foregoing given range. This also contributes to the reduction in amount of the hydrogen of the item (3).

Then, still further, in order to reduce the amount of the hydrogen resulting from the lubricant for the wire drawing in the manufacturing of the FCW of (4), a non-hydrogen-bearing molybdenum disulfide was used as an inorganic dry lubricant.

Other than these hydrogen reducing means, further, in order to reduce the amount of the hydrogen resulting from the moisture absorbed or adsorbed on the wire in the process of manufacturing the FCW of the item (3), the surface temperature of the wire is preferably held within a range of 90 to 250° C. at any part between the wire drawing start and the wire drawing completion (up to before finishing wire drawing) in the wire drawing process. The surface temperature of the wire during the wire drawing process is once held at 90° C. or more for a short time. As a result, even when moisture is contained in a common amount in the atmosphere, in other words, even when the atmosphere control for reducing the moisture content in the atmosphere is not carried out, the moisture evaporates, resulting in a reduction in the amount of moisture to be absorbed or adsorbed on the flux in the wire during wire drawing.

The surface temperature of the wire can be directly measured by means of a contact type thermoelectric thermometer [e.g., temperature meter: HET-40(E) manufactured by Anritsu Meter Co., Ltd., measurement unit: mobile rotary surface temperature measuring sensor SE9845].

The flux in the wire is increased in working degree for every reduction in diameter by forming and wire drawing after having been filled in the wire, so that the chemical or physical alteration such as the oxidation or the powdering of the flux due to the working heat proceeds. As a result, the wire has a property of tending to increasing in total moisture content. In this respect, the foregoing temperature control in the wire drawing process largely contributes in order to set the moisture content of the whole wire after drawing at 500 ppm or less.

The moisture content of the whole wire can be measured by the K.F. (Karl Fisher) moisture measurement method defined in JIS K0113. Namely, a sample wire is heated to 750° C., and the moisture is extracted from the sample wire using oxygen as a carrier gas. The extracted moisture content is measured by means of a coulometric titration method. Incidentally, the difference (W1-W2) between W1 and W2, where W2 denotes the moisture amount measured by this method in which argon is used as a carrier gas, and W1 denotes the moisture amount measured by using oxygen as the carrier gas, represents the following amount. Namely, the hydrogen which has been presented on the surface of, and in the inside of the wire (such as flux) in the hydrogen atom form derived from organic matters is oxidized to form water. The detected amount of water (the moisture derived from organic matters) is denoted by the difference (W1-W2).

On the other hand, in order to prevent the flux from absorbing moisture, it is not necessary to set the surface temperature of the wire at a high temperature of more than 250° C. When the surface temperature of the wire in the drawing process exceeds 250° C., there is a high possibility that the metal powder contained in the flux is oxidized. Further, the wire drawability and the wire drawing efficiency are also remarkably reduced. Once the flux has been oxidized, then, it becomes more likely to absorb moisture. This also conversely results in an increase in wire hydrogen. Further, the initially designed deoxidization performance is not provided during welding, resulting in an increase in oxygen amount of the welded metal. This adversely affects the mechanical performances (impact value, and the like).

Herein, a specific control means for keeping the temperature of the wire is as follows. In order to raise the temperature, 40 to 70° C. warm water is sprayed in a wire drawing furnace, or other operations are carried out, thereby to set the temperature inside the wire drawing furnace at a relatively high temperature. Thus, the synergism with the generated heat in wire drawing invariably provides a wire temperature of 90° C. or more. Whereas, when the wire temperature is required to be reduced to 250° C. or less because of the large generated heat in wire drawing, the inside of the furnace is water-cooled for releasing the generated heat in working from the wire drawing furnace, also for the purpose of achieving favorable lubricity in wire drawing. The temperature retention of the wire may be carried out in a short time, and plural time or repeatedly in the wire drawing process. However, it is not necessary to provide a specific thermal insulation means there for, to reduce the drawing speed of the wire during drawing, or the like.

Incidentally, in order that the surface temperature of the wire in the wire drawing process falls within the proper temperature range, the sheath hoop (band steel) immediately before inclusion (filling) of the flux may also be heated. When the temperature of the U-shaped formed band steel at the outlet of the process of forming the band steel, such as forming of a band steel in a U-shape falls within a range of 60 to 150° C. to this end, the surface temperature of the wire in the wire drawing step can be set within the proper temperature range.

As the type of the sheath hoop (band steel) to which the manufacturing method of the present invention is applied, a mild steel is preferably used. The foregoing respective conditions of "t/W of the band steel is 0.06 to 0.12"; "the surface of the wire after drawing has a Vickers hardness of 170 to 240 Hv"; and "in any part of the wire drawing process, the surface temperature of the wire is 90 to 250° C." are preferred conditions at least for the case where a mild steel is used as the sheath. However, the wires to which the manufacturing method of the present invention is applicable are not limited to a mild steel. The manufacturing method of the present invention can be used for wire hoops using, as the sheaths, various steel species such as a high tensile strength steel, a stainless steel, and a heat-resistant steel. Whereas, even when a mild steel is used as the sheath, the components thereof are not limited to the components shown in Table 1 of examples described later. The manufacturing method of the present invention can be used for mild steels of various components.

EXAMPLES

Below, examples of the present invention will be described. In the FCW manufacturing process shown in FIG. 1A, FCWs with a product diameter of 1.2-mm were manufactured using the respective band steels (hoops) made of mild steel sheets of the components shown in Table 1, using the respective fluxes of the components shown in Table 2, and using the respective lubricants shown in Table 3. In this step, as shown in Tables 4 and 5, the ratio t/W of the thickness t to the width W of the band steel was variously changed (within the ranges of the width of 12 to 14 mm and the thickness of 0.85 to 1.4 mm), and the secondary wire drawing conditions were changed as shown in Tables 4 and 5, thereby manufacturing FCWs. Incidentally, Table 4 shows the inventive examples and Table 5 shows comparative examples.

Herein, as the environment for the production of the FCWs, the conditions disadvantageous to the prevention of the moisture absorption of each wire flux during drawing were selected allowing for the case where the moisture content in the atmosphere in the wire drawing process is high because of lack of an air conditioning system, or naturally and environmentally. More specifically, in the atmosphere of the wire drawing process, the temperature was set at 30° C., and the humidity was set at 80%. Thus, the conditions were set higher than the production environment for a conventional FCW, equipped with an air conditioning system.

In the steps up to prior to the secondary wire drawing in FIG. 1A, i.e., from the cleaning and degreasing step 102 to the primary wire drawing steps 201 to 206 by roller dies of the band steel 100, the same conditions were employed for the respective examples. In this process, the filling flux into each U-shaped formed band steel was dried at 200° C. on a feeder. Then, 2.2-mm Φ tube-like wires were formed in common from the U-shaped formed band steels (4.6 to 4.8 mm Φ). Then, with the primary wire drawing, 2.2-mm Φ wires were drawn to 1.6-mm Φ wires.

Further, with the roller die secondary wire drawing steps 401 to 405, when the finishing drawing was performed by means of the hole die 501, each 1.6-mm Φ wire was drawn to a wire with a diameter close to the product diameter of 1.3 mm, and the resulting wire was drawn to a wire (FCW) with a product diameter of 1.2 mm by means of a hole die. Alternatively, when the finishing wire drawing by means of the hole die 501 was not carried out, wire drawing to a wire (FCW) with a product diameter of 1.2 mm was carried out by means of roller dies. Incidentally, for the comparative examples 36 to 39 of Table 5, the secondary wire drawing step was carried out by means of 5 rows (stages) of hole die wire drawing devices, and the subsequent steps were carried out under the same conditions as with the inventive examples, thereby manufacturing a FCW.

Incidentally, in the roller die secondary wire drawing step, 40 to 70° C. warm water was sprayed in a wire drawing furnace of the roller dies 205 and 206, thereby to set the temperature inside the wire drawing furnace at a relatively high temperature. Thus, with the synergism with the generated heat in wire drawing, the wire was once heated to, and held at a temperature of 150 to 180° C. in the wire drawing furnace of the roller dies 205 and 206.

The lubricant removal from the surface of the wire after wire drawing was carried out by the lubricant removing means 115+108, and the coating of the lubricant for wire feeding is carried out by coating a rapeseed oil with the electrostatic oil coating means 109 through the same in-line process as for the secondary wire drawing step as shown in FIG. 1A. Then, the coated wire was rewound as a product FCW.

Whereas, throughout the primary and secondary roller die wire drawing steps, the high rigidity roller die shown in FIG. 2 was used. Both the material used for the roller die and the material used for the hole die were those of a WC—Co system composition prepared by sintering fine WC particles with an average particle diameter of 1 μm with Co as a binder. In this step, for every example, the rigidity of the integral type rectangular framework body of the roller die in the wire drawing process was as high as 40 μm in terms of elongation amount by the tensile test of the rectangular framework body shown in FIG. 5. However, only for inventive examples 12 and 13, and Comparative Examples 25, 26, and 27 in Tables 4 and 5, the elongation amount of the rectangular framework body of only the roller die 405 which provides the highest wire drawing speed in the secondary wire drawing was changed to carry out wire drawing.

Then, under the conditions, the maximum secondary wire drawing speed capable of ensuring stable wire drawing was measured. The shape accuracy (roundness) of FCWs after rewinding, the Vickers hardness of the FCW surface (which is described as the wire characteristic after drawing in Tables 4 and 5) (wherein the whole oil components are removed for the hardness measurement), the moisture content of the wire after drawing, and the residual wire drawing lubricant amount of the wire after drawing (the number of gram of sulfur per 10 kg of the wire). Sampling of test samples of the wires after drawing for these performances was carried out from the final terminal end of the wire after drawing during the steps from after the hole die drawing 501 up to the lubricant removing step 108.

The roundness of each FCW was measured by means of RONDCOM 30B roundness measuring instrument manufactured by Tokyo Seimitsu Co., Ltd. The FCW with a roundness with a dispersion of less than ±5 μm was rated as ○; the FCW with a dispersion of ±5 to 10 μm, Δ; and the FCW with a dispersion of more than ±10 μM, x.

The hydrogen content and the moisture content in each FCW was measured by means of the K. F. (Karl Fisher) moisture content measuring method by converting the total content to the moisture content.

The residual wire drawing lubricant oil amount of each FCW was measured in the following manner. Samples were collected from 50 sites spaced 100 mm apart from one another along the direction of the length of the FCW rear end side. The wire surface was extracted with an organic chlorine-containing or an organic fluorine-containing solvent. The sulfur concentrations thereof were measured by an infrared-absorbing analysis method, averaged as the amount of sulfur deposited on each FCW, and the average was converted to the value per 10 kg of the wire. These results are shown in Tables 4 and 5.

Figure 6:
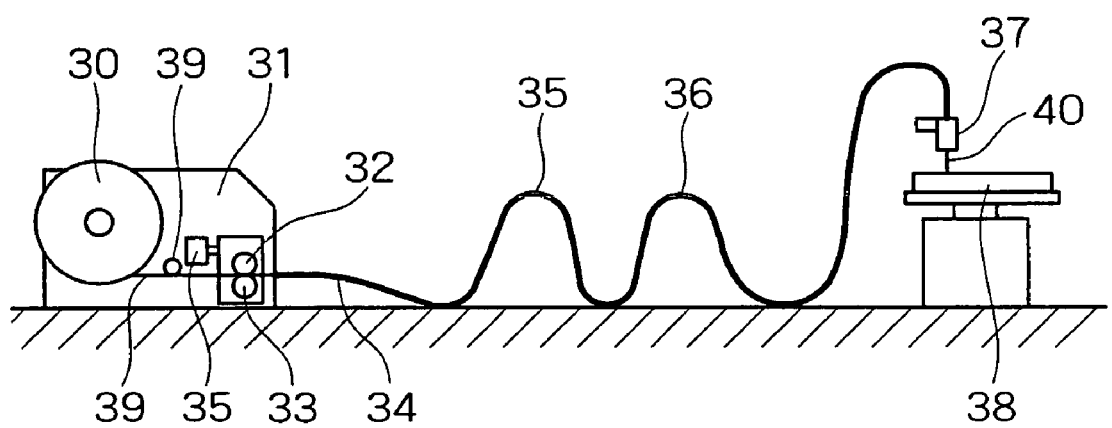
FIG. 6 is a front view showing a wire supply device.

Whereas, these FCWs were evaluated for their wire feedability and the welding properties in the butt welding between mild steel sheets (1 mm t). As for the wire feedability, the evaluations was carried out in the following manner. By the use of a wire supply device shown in FIG. 6, the wire feedability to a $CO_2$ gas shielding welding device 107 when the wire had two bent portions 106 was evaluated. The conditions for $CO_2$ gas shielding welding were as follows: welding current: 300 A, welding voltage: 32 V, welding speed: 30 cm/min, and $CO_2$ shielding gas: 25 L/min.

Then, the wire feedability was evaluated as follows. The wire feedability was rated as ○ when the wire supply was able to be carried out without interruption. It was rated as Δ when the wire supply was about to be interrupted about 1 or 2 times during the welding operation, but the welding operation was able to be carried out without interruption. It was rated as x, when the wire supply was often interrupted during the welding operation, so that the welding operation was interrupted.

The weldability of each FCW was evaluated according to the arc stability, and whether welding defect occurred or not at the welded site through the micro-observation of the welded site. The arc stability was evaluated by visually evaluating the arc during the welding operation as follows. The arc stability was rated as ○ when the arc was consistently stable. It was rated was Δ when the arc was not stable partially. It was rated as x when the arc was consistently not stabilized. The welding defect was evaluated as follows. The welding defect was rated as ○ when there were no pore and no welding defect at all. It was rated as Δ when some porosities which cannot be identified as welding defects, and can be predicted to slightly reduce the toughness of the joint portion. It was rated as x when a large number of porosities which can be identified as welding defects were generated. These results are also shown in Tables 4 and 5.

As apparent from Tables 4 and 5, in the wire drawing process, all the steps of wire drawing to the product diameter were carried out using a wire drawing lubricant containing a sulfur containing high-pressure lubricant such as molybdenum disulfide by means of roller dies made of a WC—Co system super hard material, and all the steps of removing the lubricant by a physical means from the drawn wire, and coating the lubricant for wire feeding on the wire surface were carried out in the in-line process for inventive examples 1 to 24. In every example, basically, the FCW has both favorable feedability and weldability, and further the secondary wire drawing speed is also high.

However, the inventive examples departing from the preferred conditions or the scope of the conditions of the present invention are relatively inferior in feedability and weldability of each FCW, or secondary wire drawing maximum speed as compared with the inventive examples within the conditions and the scope of the conditions.

The inventive example 1 in which the ratio t/W of the thickness t to the width W of the band steel is relatively as small as 0.05 is not capable of holding such a strength as to withstand wire drawing working, and hence becomes more likely to undergo breaking. Therefore, the inventive example 1 is relatively smaller in maximum wire drawing speed as compared with the inventive example 2 with a t/W of 0.06. For this reason, the wire drawing time is long, and the moisture content in the wire is slightly large. In the evaluation of the weldability of the inventive example 1, no pore defect at the welded site is formed. However, this trend of the increase in moisture content indicates the following fact. Namely, as described above, when the moisture content in the atmosphere in the wire drawing process is still higher, there is a high possibility that the amount of moisture to be absorbed by the wire during drawing increases to such a degree as to cause welding defects. Further, there is a possibility that the wire feedability is also reduced.

On the other hand, conversely, the inventive example 4 in which the ratio t/W of the thickness t of the band steel to the width W of the band steel is 0.13 is roughly the same in terms of maximum wire drawing speed, but is slightly higher in moisture content of the wire as compared with the inventive example 3 having a t/W of 0.12. This is conceivably due to the following fact. Namely, as described above, the powdering (reduction in size) of the wire-filled (-included) flux during the wire drawing process advances excessively, resulting in an increase in moisture absorption property of the wire. In the weldability evaluation of the inventive example 4, no pore defect at the welded site is formed. However, under such wire drawing conditions as to cause a further increase in surface area of the flux, or when it is difficult to control the moisture content in the atmosphere in the wire drawing process to a very small content, there is a high possibility that the amount of moisture to be absorbed by the wire (flux) during drawing increases to such a degree as to cause welding defects.

As for the inventive example 6 prepared by controlling the working amount of the roller dies during the secondary wire drawing step, and making the wire surface hardness after finishing wire drawing relatively as low as 170 Hv, the stiffness of the FCW has been reduced, resulting in a reduction of the wire feedability. On the other hand, also for the inventive example 7 prepared by controlling the reduction of the roller dies during wire drawing, and making the wire surface hardness after finishing wire drawing relatively as high as 240 Hv, the wire feedability has been reduced.

As for the inventive example 8 wherein the residual wire drawing lubricant deposition amount after wire drawing is relatively as small as 0.5 g per 10 kg of the wire, the secondary wire drawing maximum speed is smaller as compared with other inventive examples with a relatively large lubricant deposition amount. For this reason, as compared with other inventive examples with a high secondary wire drawing maximum speed, the moisture content of the whole wire has been slightly increased. However, in the weldability evaluation of the inventive example, no pore defect at the welded site is formed. This trend of the increase in moisture content indicates the following fact. Namely, according to the environment for the production of the FCW, particularly, when it is further difficult to control the moisture content in the atmosphere in the wire drawing process to a very small content, and the moisture content in the atmosphere in the wire drawing process is high, there is a high possibility that the wire moisture content during drawing increases to such a degree as to cause welding defects.

Conversely, for the inventive example 9 in which the amount of the lubricant deposited in the wire drawing process is relatively as high as 3.0 g per 10 kg of the wire, the arc stability during welding is relatively inferior as compared with other inventive examples with a relatively low amount of the lubricant deposited. This is conceivably due to the fact that the lubricant has slightly remained on the FCW surface in such an amount as to affect the arc stability even by the in-line lubricant removing step.

As for the inventive example 10 in which the wire was not once heated to and held at a temperature of 150 to 180° C. in the wire drawing furnace of the roller dies 205 and 206 in the secondary wire drawing step, the moisture content of the wire has been slightly increased as compared with other inventive examples in which each wire was heated and held. This is conceivably due to the following fact. Namely, the inventive example 10 was not largely different in secondary wire drawing maximum wire drawing speed from other inventive examples. This caused a difference in moisture absorbing property of the wire during the wire drawing process. Incidentally, in the weldability evaluation of the inventive example 10, no pore defect at the welded site is formed.

However, this trend of the increase in moisture content indicates the following fact. Namely, as described above, when the moisture content in the atmosphere in the wire drawing process becomes still higher, there is a high possibility that the wire moisture content during drawing increases to such a degree as to cause welding defects.

As for the inventive example 11, in which finishing wire drawing was not carried out by means of the hole die 501, the wire feedability has not been affected, but the shape accuracy such as the roundness of the wire is relatively inferior as compared with other inventive examples which are equal in other conditions. However, this indicates as follows. Namely, when the wire drawing speed is increased, or other wire drawing conditions for the shape accuracy of the wire become more severe, there is a high possibility that the wire feedability is reduced.

As for the inventive example 13 in which the rigidity of the integral type rectangular framework body of the roller die has been set relatively as low as 150 μm in terms of the elongation amount by the tensile test, the wire drawing speed is higher than with the comparative examples 25 to 27 of Table 5, in which the rigidity of each rectangular framework body similarly has been set lower, i.e., set at 160 μm in terms of the elongation amount, so that the rigidity of the rectangular framework body has been more reduced with other conditions being the same. However, the wire drawing speed has been slowed than with other inventive examples in which the rigidity of each rectangular frame work body is higher. This is for the following reason. Namely, when the wire drawing speed was increased, vibration was generated in the dies. Thus, in order to prevent the occurrence of the chatter mark on the wire, or in order to ensure the shape accuracy, there was no other choice but to slow the wire drawing speed.

As for the comparative examples 25 to 27 of Table 5, in which the rigidity of the integral type rectangular framework body of each roller die has been lowered to more than 150 μm in terms of elongation amount by the tensile test, the wire drawing speed cannot be increased, and is remarkably slow. Further, even at the slow wiring speed, the chatter mark was generated on the wire, which has inhibited the shape accuracy from being ensured. For this reason, the wire feedability was also low, which did not allow the welding operation itself to be performed. Therefore, it was also no possible to evaluate the weldability.

On the other hand, for the inventive example 12 in which the rigidity of the integral type rectangular framework body of the roller die has been set at relatively as high as 20 μm in terms of elongation amount by the tensile test, when the wire drawing speed is increased, the load on the roller die is increased. Thus, the fatigue strength of the roller die is reduced during wire drawing, so that the surface of the roller die made of the WC—Co system cemented carbide tool is roughened. For this reason, in order to ensure such a wire amount as to allow stable wire drawing, there was no other choice but to relatively slow the wire drawing speed. This indicates the critical significance of the elongation amount of the framework body, which is the rigidity of the integral type framework body of a wire drawing device in high-speed wire drawing by the roller die for a high strength welding solid wire.

Further, for all the inventive examples 14 to 24 in which the combination of the band steel component and the flux component was changed, and further, the type of the wire drawing lubricant was variously changed within A to E shown in Table 3, and other wire drawing conditions were the same, the same preferred results have been obtained.

In contrast, for the comparative examples 28 to 35 in which the wire drawing lubricants F and G shown in Table 3, not containing a sulfur-bearing high-pressure lubricant have been used, even at a slow wire drawing speed, the die vibration and the chatter marks on the wire were generated, so that it was not possible to perform wire drawing itself.

Whereas, even when the various wire drawing lubricants indicated with A, B, and D in Table 3, containing the sulfur-bearing high-pressure lubricant of the present invention were used for wire drawing by a hole die, as shown in the comparative examples 36 to 39 using a hole die for the secondary wire drawing, even at a slow wire drawing speed, the die vibration and the chatter marks on the wire were generated, so that it was not possible to perform wire drawing itself.

Therefore, the foregoing results indicate as follows. Namely, so long as the overall wire drawing from the tube-like formed wire to the wire with roughly a product diameter can be performed by means of roller dies, and the wire drawing lubricant containing a sulfur-bearing lubricant of the present invention is used, it is possible to increase the wire drawing speed while ensuring the shape accuracy and the welding characteristics. Further, the foregoing results indicates the significance of the requirements of the present invention and the preferred requirements of the present invention on the favorable feedability and the low hydrogen content characteristic of the seamed flux-cored welding wire, or the roller die wire drawability such as the wire drawing speed.

TABLE 1

Band steel (hoop) characteristics

Chemical components (mass %, balance Fe and impurities)

| No. | C | Si | Mn | S | P | Al | Ti | N | Tensile strength (Mpa) |
|---|---|---|---|---|---|---|---|---|---|
| X | 0.040 | 0.01 | 0.25 | 0.004 | 0.008 | 0.048 | 0.005 | 0.0022 | 365 |
| Y | 0.005 | 0.02 | 0.25 | 0.004 | 0.010 | 0.040 | 0.005 | 0.0020 | 295 |

TABLE 2

Components of flux (mass %: ratio by mass relative to the total wire weight)

| No. | Fe | C | Mn | Si | Ti | Al | $SiO_2$ | $TiO_2$ | $Al_2O_3$ | $K_2O$ | $NaAlSi_3O_8$ | Total |
|---|---|---|---|---|---|---|---|---|---|---|---|---|
| a | 11.25 | 0.02 | 2.01 | 0.95 | 0.15 | 0.10 | 0.14 | 0.25 | 0.10 | 0.03 | — | 15 |
| b | 5.6 | 0.04 | 2.40 | 0.70 | — | — | — | 1.00 | 3.76 | — | 1.50 | 15 |

TABLE 3

| Category | No. | Sulfur-bearing high-pressure lubricant | Carrier agent, Dispersant, or Solvent | Remark |
|---|---|---|---|---|
| Inventive Example | A | Molybdenum disulfide 50 mass % | Calcium carbonate 40 mass % + Naphthalene 10 mass % | Dry lubricant |
| Inventive Example | B | Olefin sulfide 2.0 mass % + Sulfurized fat and oil 2.2 mass % | Rapeseed oil 95.8 mass % | Dry lubricant |
| Inventive Example | C | Molybdenum disulfide 20 mass % | Potassium octylate 2 mass % + Water 78 mass % | Wet lubricant |
| Inventive Example | D | Tungsten disulfide 20 mass % | Sodium oleate 2 mass % + Naphthalene 10 mass % + Calcium carbonate 68 mass % | Dry lubricant |
| Inventive Example | E | Sulfur 20 mass % | Potassium oleate 8 mass % + Rapeseed oil 2 mass % + Calcium carbonate 70 mass % | Dry lubricant |
| Comparative Example | F | Sodium stearate 90 mass % | Carbon fluoride 10 mass % | Dry lubricant |
| Comparative Example | G | Potassium stearate 90 mass % | Naphthalene 10 mass % | Dry lubricant |

TABLE 4

| Category | No. | Band steel No. | Flux No. | Ratio t/W of thickness t to width W of band steel | Secondary wire drawing step | | | | |
|---|---|---|---|---|---|---|---|---|---|
| | | | | | Lubricant | Die used | Holding of wire at high temperature | Hole die finishing wire drawing | Maximum wire drawing speed |
| Inventive Example | 1 | X | a | 0.05 | A | Roller die | Done | Done | 700 |
| | 2 | X | a | 0.06 | A | Roller die | Done | Done | 900 |
| | 3 | X | a | 0.12 | A | Roller die | Done | Done | 900 |
| | 4 | X | a | 0.13 | A | Roller die | Done | Done | 900 |
| | 5 | X | a | 0.08 | A | Roller die | Done | Done | 1000 |
| | 6 | X | a | 0.08 | A | Roller die | Done | Done | 1000 |
| | 7 | X | a | 0.08 | A | Roller die | Done | Done | 900 |
| | 8 | X | a | 0.08 | A | Roller die | Done | Done | 800 |
| | 9 | X | a | 0.08 | A | Roller die | Done | Done | 1000 |
| | 10 | X | a | 0.08 | A | Roller die | Non | Done | 1000 |
| | 11 | X | a | 0.08 | A | Roller die | Done | Non | 1200 |
| | 12 | X | a | 0.08 | A | Roller die* | Done | Done | 700 |
| | 13 | X | a | 0.08 | A | Roller die* | Done | Done | 700 |
| | 14 | X | a | 0.08 | B | Roller die | Done | Done | 800 |
| | 15 | X | a | 0.08 | C | Roller die | Done | Done | 800 |
| | 16 | X | a | 0.08 | D | Roller die | Done | Done | 850 |
| | 17 | X | a | 0.08 | E | Roller die | Done | Done | 850 |
| | 18 | X | b | 0.08 | A | Roller die | Done | Done | 1000 |
| | 19 | Y | a | 0.08 | A | Roller die | Done | Done | 1000 |
| | 20 | Y | b | 0.08 | A | Roller die | Done | Done | 1000 |
| | 21 | Y | a | 0.08 | B | Roller die | Done | Done | 800 |
| | 22 | Y | a | 0.08 | C | Roller die | Done | Done | 800 |
| | 23 | Y | a | 0.08 | D | Roller die | Done | Done | 850 |
| | 24 | Y | a | 0.08 | E | Roller die | Done | Done | 850 |

| Category | No. | Shape accuracy | Surface hardness (Hv) | Moisture content (ppm) | Residual lubricant amount g/10 kg of wire | FCW performances | | |
|---|---|---|---|---|---|---|---|---|
| | | | | | | Wire feedability | Arc stability | Welding pore defect |
| Inventive Example | 1 | ○ | 170 | 400 | 2.0 | ○ | ○ | ○ |
| | 2 | ○ | 180 | 300 | 2.0 | ○ | ○ | ○ |
| | 3 | ○ | 220 | 320 | 1.8 | ○ | ○ | ○ |
| | 4 | ○ | 230 | 350 | 1.7 | ○ | ○ | ○ |
| | 5 | ○ | 200 | 320 | 1.5 | ○ | ○ | ○ |
| | 6 | ○ | 170 | 300 | 1.7 | Δ | ○ | ○ |
| | 7 | ○ | 240 | 330 | 1.4 | Δ | ○ | ○ |
| | 8 | ○ | 210 | 350 | 0.5 | ○ | ○ | ○ |
| | 9 | ○ | 200 | 340 | 3.0 | ○ | Δ | ○ |
| | 10 | ○ | 220 | 400 | 1.2 | ○ | ○ | ○ |
| | 11 | Δ | 200 | 300 | 0.7 | Δ | ○ | ○ |
| | 12 | ○ | 210 | 290 | 0.8 | ○ | ○ | ○ |
| | 13 | ○ | 190 | 330 | 1.2 | ○ | ○ | ○ |
| | 14 | ○ | 205 | 450 | 0.8 | ○ | ○ | ○ |

TABLE 4-continued

| | 15 | ○ | 210 | 400 | 2.5 | ○ | ○ | ○ |
|---|---|---|---|---|---|---|---|---|
| | 16 | ○ | 195 | 330 | 2.2 | ○ | ○ | ○ |
| | 17 | ○ | 190 | 380 | 2.1 | ○ | ○ | ○ |
| | 18 | ○ | 190 | 330 | 1.8 | ○ | ○ | ○ |
| | 19 | ○ | 175 | 300 | 1.9 | ○ | ○ | ○ |
| | 20 | ○ | 195 | 300 | 1.8 | ○ | ○ | ○ |
| | 21 | ○ | 205 | 440 | 0.9 | ○ | ○ | ○ |
| | 22 | ○ | 210 | 400 | 2.6 | ○ | ○ | ○ |
| | 23 | ○ | 195 | 330 | 2.3 | ○ | ○ | ○ |
| | 24 | ○ | 190 | 380 | 2.2 | ○ | ○ | ○ |

*The rigidity (elongation amount) of the roller die framework body of the inventive example 12 is 20 μm.
*The rigidity (elongation amount) of the roller die framework body of the inventive example 13 is 150 μm.

TABLE 5

| Category | No. | Band steel No. | Flux No. | Ratio t/W of thickness t to width W of band steel | Secondary wire drawing step | | | | |
|---|---|---|---|---|---|---|---|---|---|
| | | | | | Lubricant | Die used | Holding of wire at high temperature | Hole die finishing wire drawing | Maximum wire drawing speed |
| Comparative Example | 25 | X | a | 0.08 | A | Roller die* | Done | Done | 550 |
| | 26 | X | a | 0.08 | B | Roller die* | Done | Done | 550 |
| | 27 | X | a | 0.08 | C | Roller die* | Done | Done | 550 |
| | 28 | X | a | 0.08 | F | Roller die | Done | Done | 500 |
| | 29 | X | a | 0.08 | G | Roller die | Done | Done | 500 |
| | 30 | X | a | 0.08 | F | Roller die | Done | Done | 500 |
| | 31 | Y | a | 0.08 | F | Roller die | Done | Done | 500 |
| | 32 | Y | b | 0.08 | F | Roller die | Done | Done | 500 |
| | 33 | Y | a | 0.08 | G | Roller die | Done | Done | 500 |
| | 34 | X | b | 0.08 | G | Roller die | Done | Done | 500 |
| | 35 | Y | b | 0.08 | G | Roller die | Done | Done | 500 |
| | 36 | Y | b | 0.08 | A | Hole die | Non | Done | 400 |
| | 37 | X | b | 0.08 | A | Hole die | Non | Done | 400 |
| | 38 | Y | a | 0.08 | B | Hole die | Non | Done | 400 |
| | 39 | Y | b | 0.08 | D | Hole die | Non | Done | 400 |

| Category | No. | Drawn wire characteristics | | | | FCW performances | | |
|---|---|---|---|---|---|---|---|---|
| | | Shape accuracy | Surface hardness (Hv) | Moisture content (ppm) | Residual lubricant amount g/10 kg of wire | Wire feed-ablity | Arc stablity | Welding pore defect |
| Comparative Example | 25 | x | — | — | — | x | — | — |
| | 26 | x | — | — | — | x | — | — |
| | 27 | x | — | — | — | x | — | — |
| | 28 | x | — | — | — | x | — | — |
| | 29 | x | — | — | — | x | — | — |
| | 30 | x | — | — | — | x | — | — |
| | 31 | x | — | — | — | x | — | — |
| | 32 | x | — | — | — | x | — | — |
| | 33 | x | — | — | — | x | — | — |
| | 34 | x | — | — | — | x | — | — |
| | 35 | x | — | — | — | x | — | — |
| | 36 | x | — | — | — | x | — | — |
| | 37 | x | — | — | — | x | — | — |
| | 38 | x | — | — | — | x | — | — |
| | 39 | x | — | — | — | x | — | — |

Each rigidity (elongation amount) of the roller die framework bodies of the comparative examples 25, 26, and 27 is 160 μm.

What is claimed is:
1. A method for manufacturing a seamed flux-cored wire comprising a sheath prepared by forming a band steel in a tube and a flux filled inside the sheath, the method comprising the steps of:
   forming the band steel into U-shape in cross section;
   filling the U-shape formed band steel with flux;
   forming the U-shape formed band steel filled with flux into a tube-like formed wire;
   applying a wire drawing lubricant containing a sulfur-bearing high-pressure lubricant to the tube-like formed wire to provide a lubricant coated tube-like formed wire;
   drawing the lubricant coated tube-like formed wire, wherein drawing of a wire having an area no greater than 1.1 times a final product area is performed using a roller die;
   removing the lubricant from the drawn wire by a physical means; and coating a wire feeding lubricant for wire feeding on the wire surface, wherein at least a part of the drawing step, the removing step and the coating step are performed in an in-line manner, and wherein the wire drawing lubricant is applied in an amount such that the amount of the wire drawing lubricant remaining on the surface of the wire after drawing falls within the range of 0.1 to 0.6 g of sulfur per 10 kg of the wire in terms of the sulfur amount on the surface of the wire after drawing.

2. The method for manufacturing a seamed flux-cored welding wire according to claim I, wherein the drawing step includes final finishing by means of a hole die.

3. The method for manufacturing a seamed flux-cored welding wire according to claim 1, wherein the wire drawing lubricant for wire drawing contains molybdenum disulfide.

4. The method for manufacturing a seamed flux-cored welding wire according to claim 1, wherein a framework body supporting the roller die has a high rigidity in the range of 20 to 150 μm in terms of the elongation amount of the framework body, when the framework body supporting the roller die is applied with a tensile load of 10000 N in the direction of the wire drawing load of the roller die, and expanded.

5. The method for manufacturing a seamed flux-cored welding wire according to claim 1, wherein the ratio t/W of the thickness t of the band steel to the width W of the band steel falls within a range of 0.06 to 0.12.

6. The method for manufacturing a seamed flux-cored welding wire according to claim 1, wherein the surface of the wire after drawing has a hardness in the range of 170 to 240 Hv in terms of the Vickers hardness.

7. The method for manufacturing a seamed flux-cored welding wire according to claim 1, wherein in any of the wire drawing steps, the surface temperature of the wire falls within a range of 90 to 250° C.

8. The method for manufacturing a seamed flux-cored welding wire according to claim 1, wherein the band steel is previously subjected to cleaning and degreasing prior to the forming step, and the wire drawing lubricant is coated on only the surface to be the wire surface of the band steel.

9. The method for manufacturing a seamed flux-cored welding wire according to claim 1, wherein the moisture content of the wire after drawing is 500 ppm or less.

10. The method for manufacturing a seamed flux-cored welding wire according to claim 1, wherein the lubricant coated tube-like formed wire is drawn to the final product diameter using a roller die.

11. The method for manufacturing a seamed flux-cored welding wire according to claim 1, wherein the step of forming a steel band, the filling step, the step of forming into a tube-like formed wire the applying step, the drawing step, the removing step and the coating step are all performed in an in-line manner.

* * * * *